United States Patent
Chiew et al.

(10) Patent No.: US 9,245,450 B1
(45) Date of Patent: Jan. 26, 2016

(54) SYSTEM, APPARATUS, AND METHOD FOR GENERATING RUNWAY VISUAL AIDS ON AN AIRCRAFT DISPLAY UNIT

(75) Inventors: Daniel Y. Chiew, Marion, IA (US); David A. Frank, North Liberty, IA (US); Travis S. VanDerKamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1263 days.

(21) Appl. No.: 12/217,458

(22) Filed: Jul. 3, 2008

(51) Int. Cl.
G08G 5/00 (2006.01)
G05D 1/06 (2006.01)

(52) U.S. Cl.
CPC ............ G08G 5/0047 (2013.01); G05D 1/0676 (2013.01)

(58) Field of Classification Search
CPC .................................................. G05D 1/0676
USPC .............. 701/3–10, 14, 16–18; 340/963, 965, 340/972–974, 980; 345/619, 629, 632, 634
See application file for complete search history.

(56) References Cited

U.S. PATENT DOCUMENTS

| | | | | |
|---|---|---|---|---|
| 4,343,037 A * | 8/1982 | Bolton | ............ | 345/582 |
| 4,454,496 A * | 6/1984 | Lowe | ............ | 340/980 |
| 5,218,360 A * | 6/1993 | Goetz et al. | ............ | 342/407 |
| 5,289,185 A * | 2/1994 | Ramier et al. | ............ | 340/971 |
| 5,654,890 A * | 8/1997 | Nicosia et al. | ............ | 701/16 |
| 6,700,482 B2 * | 3/2004 | Ververs et al. | ............ | 340/500 |
| 6,711,479 B1 * | 3/2004 | Staggs | ............ | 701/16 |
| 6,720,891 B2 * | 4/2004 | Chen et al. | ............ | 340/969 |
| 6,822,624 B2 * | 11/2004 | Naimer et al. | ............ | 345/9 |
| 6,995,690 B1 * | 2/2006 | Chen et al. | ............ | 340/974 |
| 7,463,954 B1 * | 12/2008 | He | ............ | 701/3 |
| 7,486,291 B2 * | 2/2009 | Berson et al. | ............ | 345/427 |
| 7,564,372 B1 * | 7/2009 | Bailey et al. | ............ | 340/961 |
| 7,714,744 B1 * | 5/2010 | Wichgers | ............ | 340/965 |
| 8,010,245 B2 * | 8/2011 | Nichols et al. | ............ | 701/16 |
| 2003/0132860 A1 * | 7/2003 | Feyereisen et al. | ............ | 340/973 |
| 2004/0162648 A1 * | 8/2004 | Bontrager et al. | ............ | 701/3 |
| 2006/0250280 A1 * | 11/2006 | Chen et al. | ............ | 340/974 |
| 2007/0048084 A1 * | 3/2007 | Jung et al. | ............ | 404/9 |

(Continued)

OTHER PUBLICATIONS

U.S. Appl. No. 11/820,950, filed Jun. 21, 2007, Krenz et al.

(Continued)

*Primary Examiner* — John Q Nguyen
*Assistant Examiner* — Jordan S Fei
(74) *Attorney, Agent, or Firm* — Angel Gerdzhikov; Donna Suchy; Daniel Barbieri

(57) ABSTRACT

A present novel and non-trivial system, apparatus, and method for generating runway visual aids on an aircraft display unit. Visual aids could comprise of runway indicators corresponding to minimum and maximum rollout and touchdown points, each of which may be determined in real-time by applying input factors to one or more configurable landing profiles. Data representative of visual aids may be provided by one or more sources including runway data sources and real-time input factors. An image generating processor generates an image data set representative of a three-dimensional perspective view of a scene outside the aircraft, wherein the image data set is determined as a function of terrain data, runway data, and visual aid data. The image data set may be provided to a Head-Down Display unit, a Head-Up Display unit, or both, whereby an image contains a runway depicted with at least one visual aid.

21 Claims, 17 Drawing Sheets

(56) References Cited

U.S. PATENT DOCUMENTS

| | | | |
|---|---|---|---|
| 2008/0162092 A1* | 7/2008 | Coulmeau et al. | 703/2 |
| 2008/0252489 A1* | 10/2008 | Naimer et al. | 340/971 |
| 2008/0300735 A1* | 12/2008 | He | 701/3 |
| 2008/0300741 A1* | 12/2008 | Constans | 701/16 |
| 2010/0082187 A1* | 4/2010 | Nichols et al. | 701/16 |

OTHER PUBLICATIONS

U.S. Appl. No. 12/069,234, filed Feb. 8, 2008, Wichgers et al.
U.S. Appl. No. 12/069,319, filed Feb. 8, 2008, Wichgers.

* cited by examiner

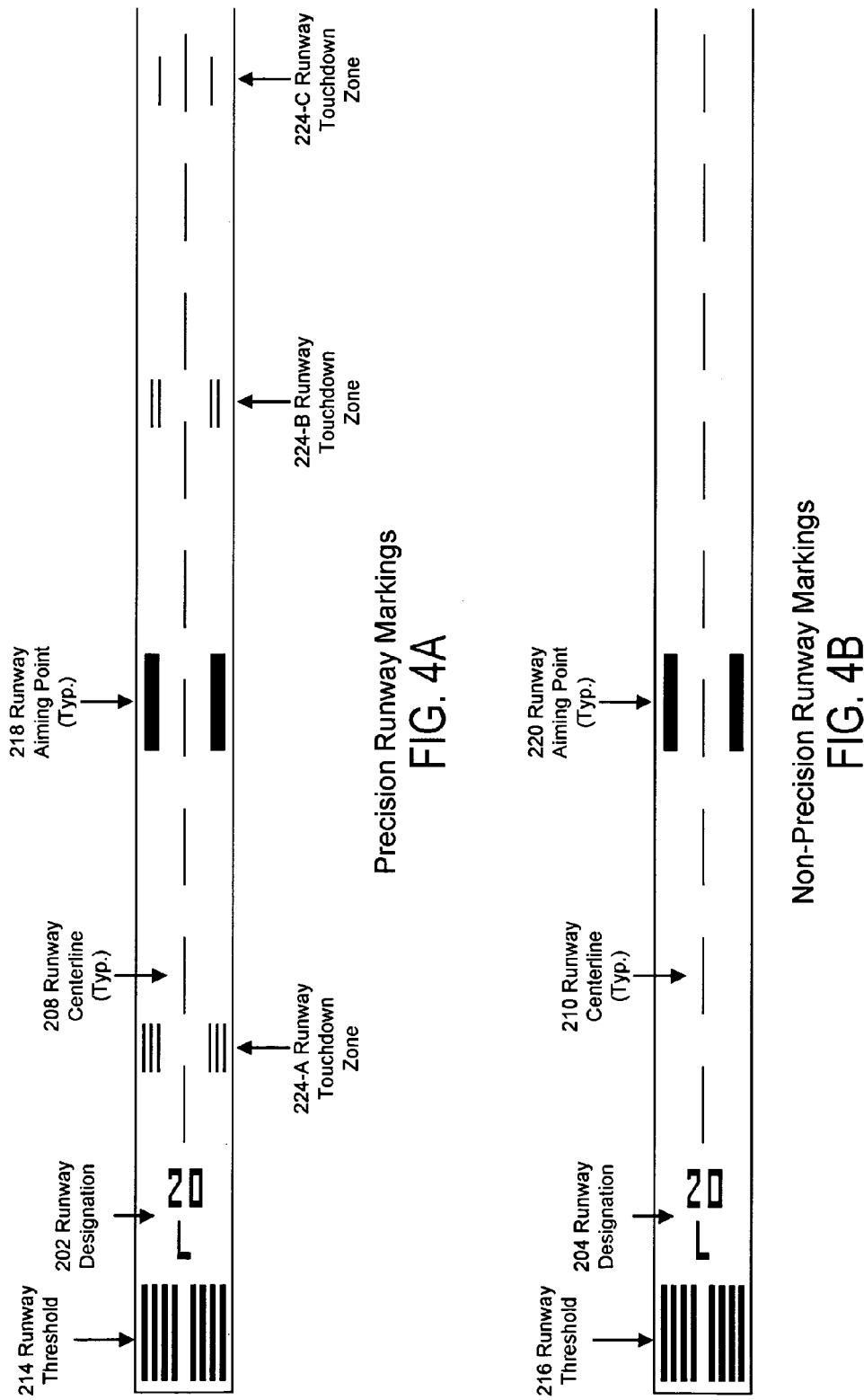
FIG. 4A Precision Runway Markings
FIG. 4B Non-Precision Runway Markings

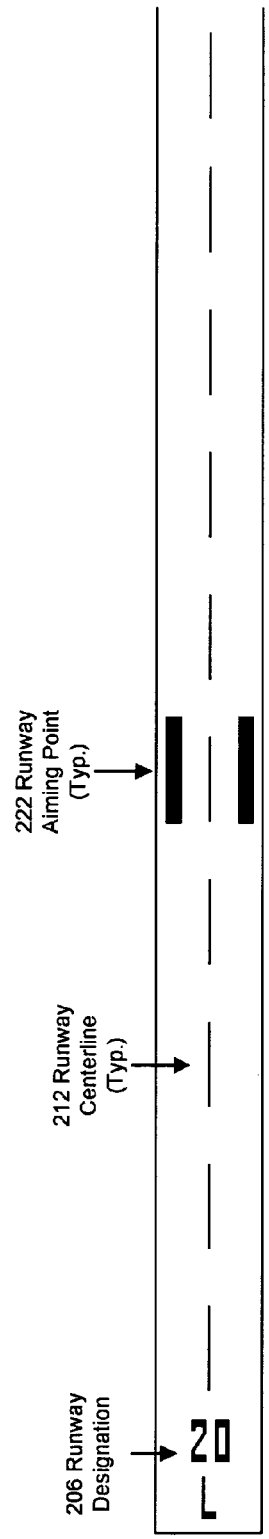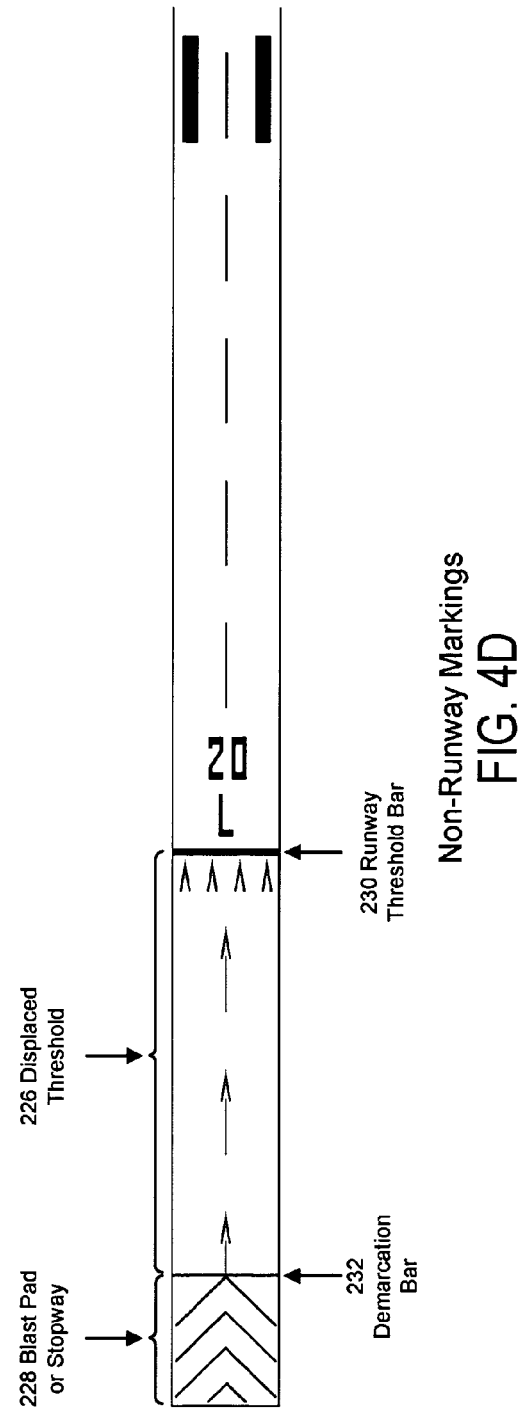

SYSTEM, APPARATUS, AND METHOD FOR GENERATING RUNWAY VISUAL AIDS ON AN AIRCRAFT DISPLAY UNIT

BACKGROUND OF THE INVENTION

1. Field of the Invention

This invention pertains generally to the field of cockpit indicators or display units that provide flight information of a runway environment to the pilot or flight crew of an aircraft, and more particularly to synthetic vision systems (SVS), enhanced vision systems (EVS), or combined SVS-EVS systems.

2. Description of the Related Art

Modern avionics systems employ Head-Down Display ("HDD") and Head-Up Display ("HUD") systems for providing tactical flight information to the pilot. In an HDD system, a tactical flight display is mounted in the cockpit instrument panel directly in front of the pilot and below windshield level. To view the presentation of information on a display unit of an HDD system, a pilot must look down into the cockpit, causing him or her to take his or her eyes from the outside scene in front of the aircraft. In a HUD system, a HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

Modern avionics systems may employ Synthetic Vision Systems ("SVS"), Enhanced Vision Systems ("EVS"), or combined SVS-EVS for displaying terrain information to both HDD and HUD systems. The SVS and EVS systems are advantageous because they may depict not only terrain but also obstacles and hard surfaces such as runways. The depiction of terrain and runway surfaces can increase a pilot's Situational Awareness and potentially provide a means of navigation. While the presentation of terrain and runway surfaces provides some advantages, an absence of runway visual cues in an SVS image, EVS image, or a combined SVS-EVS image limits the pilot's Situational Awareness of the runway environment. Such limitation could provide unnecessary challenges to a pilot who is operating an aircraft within the runway environment.

BRIEF SUMMARY OF THE INVENTION

The embodiments disclosed herein present at least one novel and non-trivial system, apparatus, and method for generating runway visual aids on an aircraft display unit. The use of a visual aid such as a real-time runway indicator, runway markings, and an extended runway centerline may be used to enhance a pilot's Situational Awareness of the runway environment.

In one embodiment, a system is disclosed for generating runway visual aids on an aircraft display unit. The system comprises a source for navigation data, a source for terrain data, a source for runway data, an image generating processor, and a display unit. In an additional embodiment, the system comprises a source for input factors for providing data that could be applied real-time to a landing profile. The image generating processor could generate an image data set representative of a scene outside the aircraft based upon the terrain data, runway data, and visual aid data, where such visual aid data could be determined by the image generating processor based upon one or more data sources. After the image data set has been generated, the image generating processor could provide the image data set to a display unit for presenting an image represented in the image data set, whereby an image is displayed containing a runway depicted with at least one visual aid. As embodied herein, the image generating processor may be a processor used in an SVS, EVS, or combined SVS-EVS. As embodied herein, the display unit could be comprised of an HDD unit, a HUD unit, or both.

In another embodiment, an apparatus is disclosed for generating runway visual aids on an aircraft display unit. The apparatus comprises an input communications interface, an image generating processor, and an output communications interface. The input communications interface facilitates the receipt of data from one or more data sources. The image generating processor could generate an image data set representative of a scene outside the aircraft based upon the terrain data, runway data, and visual aid data. After the image data set has been generated, the image generating processor could provide the image data set to an output communications interface for facilitating the providing of the image data set to a display unit. As embodied herein, the image generating processor may be a processor used in an SVS, EVS, or combined SVS-EVS. As embodied herein, the display unit could be comprised of an HDD unit, a HUD unit, or both.

In another embodiment, a method is disclosed for generating runway visual aids on an aircraft display unit. Navigation data, terrain data, and runway data could be received. In an additional embodiment, input factor data could be received. An image data set could be generated, wherein the image data set may be representative of a scene outside the aircraft based upon the terrain data, the runway data, and visual aid data. This image data set could be provided to a display unit for presenting an image represented in the image data set, whereby an image is displayed containing a runway depicted with at least one visual aid.

The drawings of FIG. 4 depict exemplary illustrations of runway and non-runway surface markings.

The drawings of FIG. 5 depict exemplary illustrations of runway and non-runway surface markings as depicted on a display unit.

Figure 6A:
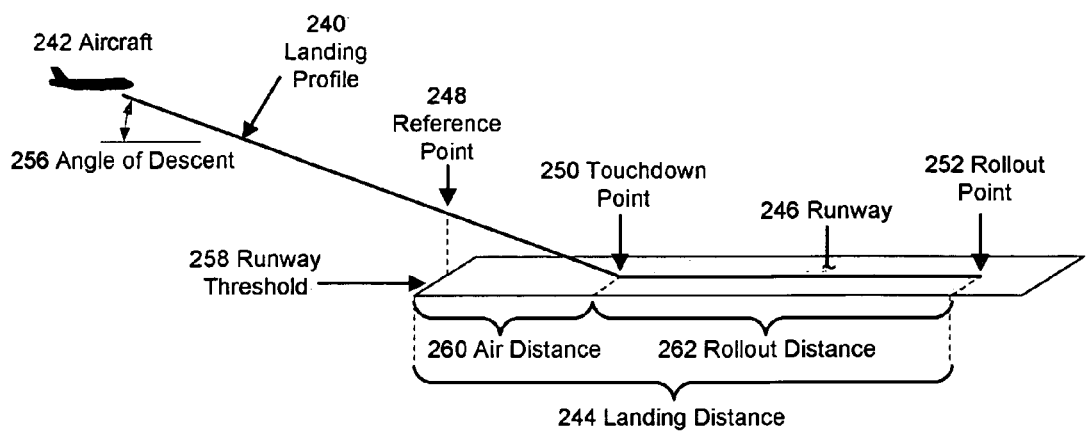

FIG. 6A depicts an exemplary illustration of configurable a landing profile and a runway.

Figure 6B:
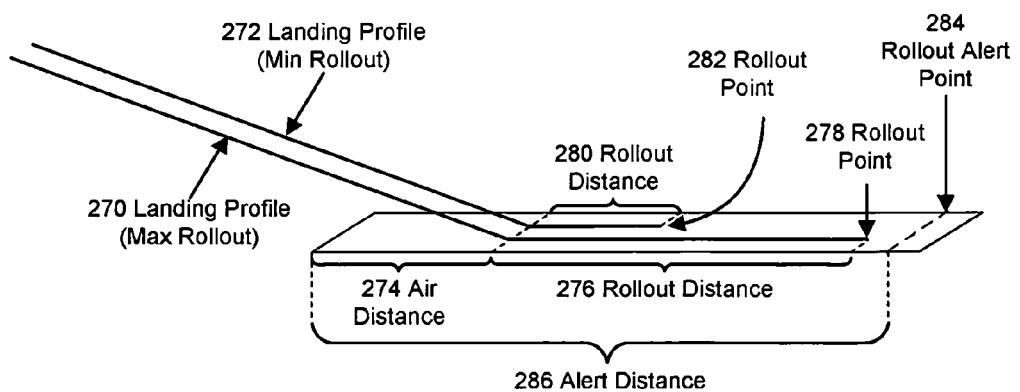
Figure 6C:
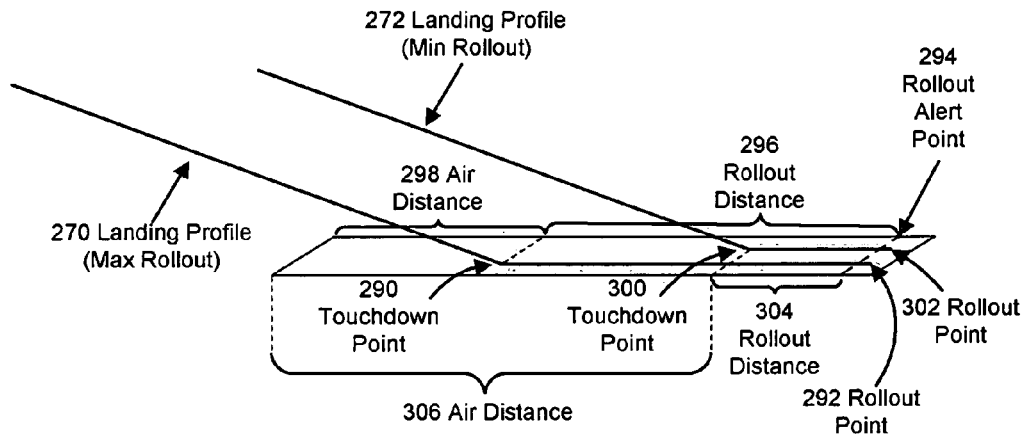
Figure 6D:
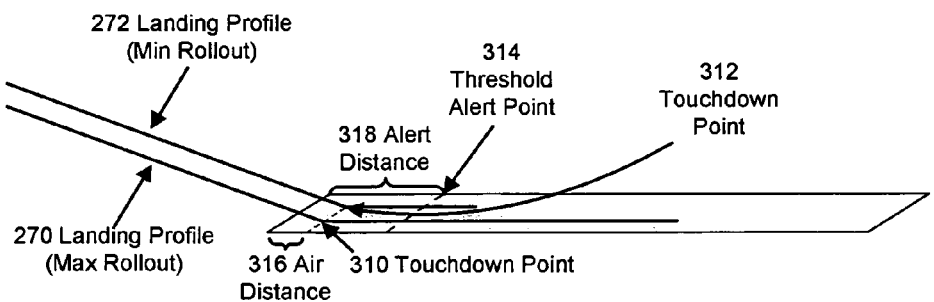

The drawings of FIGS. 6B through 6D depict exemplary illustrations of configurable landing profiles used in the determination of relevant points on a runway and corresponding distances of the profiles, where one profile is configured in a maximum rollout landing profile and the second profile is configured in a minimum rollout profile.

The drawings of FIG. 7 depict exemplary illustrations of runway visual aids comprising of indications corresponding to a minimum rollout point, a maximum stop point, and rollout alert point, where the rollout point is defined to be a stop point.

The drawings of FIG. 8 depict exemplary illustrations of runway visual aids comprising of indications corresponding to an intermediate touchdown point, a maximum touchdown point, a minimum touchdown point, and an estimated touchdown point.

The drawings of FIG. 9 depict exemplary illustrations of runway visual aids comprising of indications corresponding to a touchdown zone and an estimated touchdown point.

Figure 10:
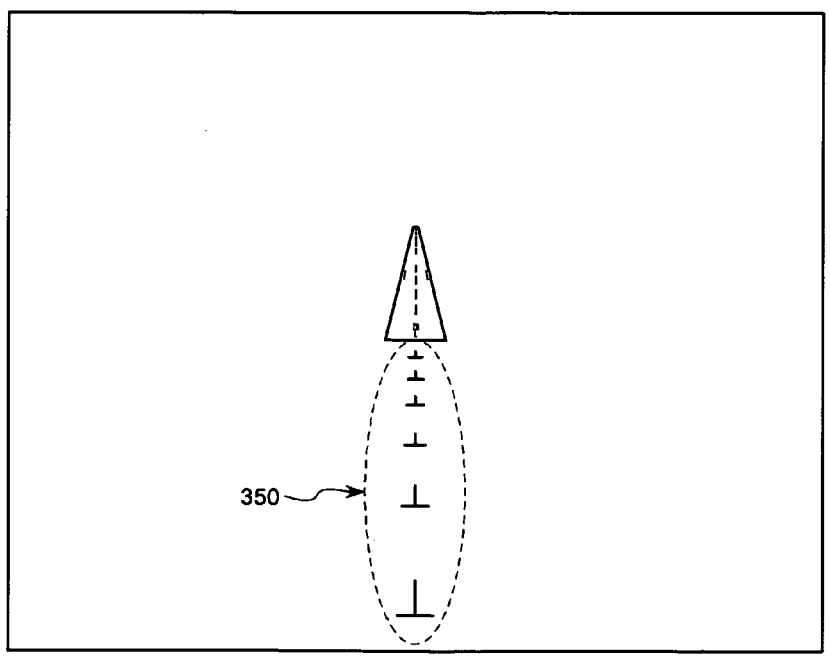

FIG. 10 depicts an exemplary illustration of runway visual aids comprising of an extended centerline.

Figure 11:
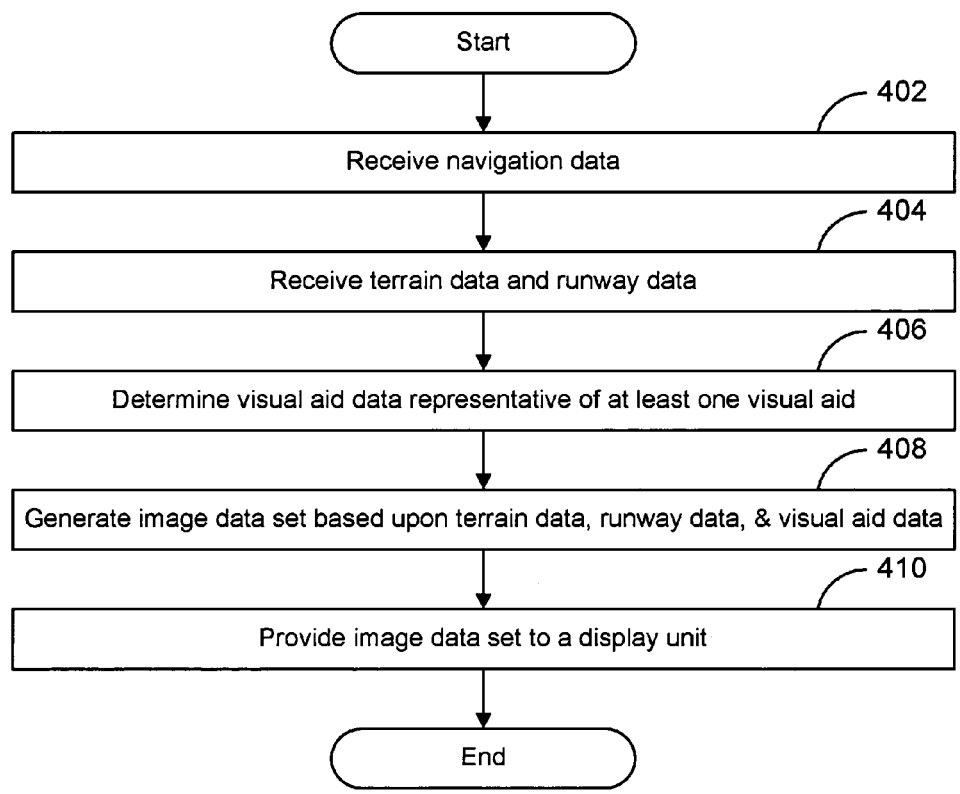

FIG. 11 provides a flowchart illustrating a method for generating runway visual aids.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 1:
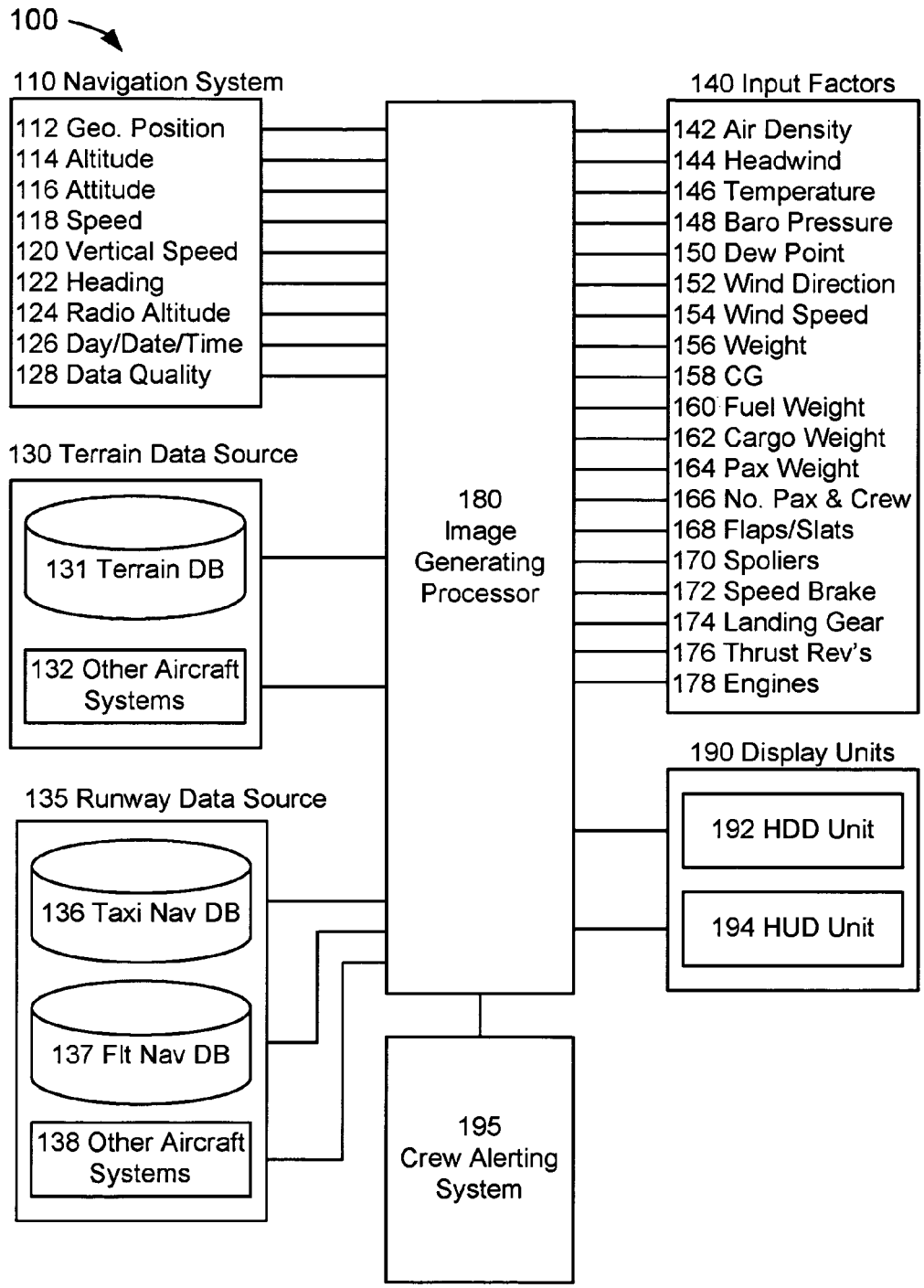
FIG. 1 depicts a block diagram of a system for generating runway visual aids.

FIG. 1 depicts a runway visual aid generation system 100 suitable for implementation of the techniques described herein. The system may be comprised of a navigation system 110, a terrain data source 130, a runway data source 135, input factors 140, an image generating ("IG") processor 180, display units 190, and crew alerting system 195.

In an embodiment of FIG. 1, a navigation system 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation data including, but not limited to, geographic position 112, altitude 114, attitude 116, speed 118, vertical speed 120, heading 122, radio altitude 124, day/date/time 126 and data quality 128 to an IG processor 180 for subsequent processing as discussed herein.

Day/date/time 126 could be data representative of the day, date, or time, or any combination of them, and may be used, for example, for determining whether a runway is available for operation. Navigation data quality 128 may include, but is not limited to, accuracy, uncertainty, integrity, and validity for data provided by a navigation system 110. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

In an embodiment of FIG. 1, a terrain data source 130 may include, but is not limited to, a terrain database 131, other aircraft systems 132, or any combination thereof. A terrain data source 130 could comprise any source of terrain data, obstacle data, other manmade or natural features, geopolitical boundaries, or any combination thereof. Obstacles may include, but are not limited to, towers, buildings, poles, wires, other manmade structures, and foliage.

A terrain database 131 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 131, taxi navigation database 136, and flight navigation database 137 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in terrain database 131, and a temporary runway closure could be stored in a flight navigation database 137. Any database used in the embodiments disclosed herein may be a stand-alone database or a combination of databases. For example, a terrain database 131 may be associated with a terrain awareness and warning system ("TAWS") only. In an alternative embodiment, terrain data could be stored in or combined with an airport database, airspace database, or with a database used by any other aircraft system including, but not limited to, a flight management computing system, or an airspace awareness and warning system ("AAWS"). An example of a TAWS and an AAWS which utilize airport and airspace databases are described in U.S. Pat. Nos. 8,234,020 and 7,714,744, respectively.

Although other aircraft systems 132 could employ terrain databases 131, such systems could also be a source of terrain data provided to an IG processor 180. For example, a synthetic vision system ("SVS") may employ a terrain database to generate terrain image data. Here, the terrain database that is part of an SVS could be the source of terrain data in system 100. Alternatively, the SVS could provide an IG processor 180 with terrain data in the form of terrain image data. In another alternative, an Enhanced Vision System ("EVS") could provide terrain data in the form of terrain image data. In another alternative, a combined SVS and EVS could provide terrain data in the form of terrain image data. Other examples of other aircraft systems 132 which could comprise sources of terrain data include, but are not limited to, a TAWS and an AAWS. As embodied herein, a terrain database 131 and other aircraft systems 132 could provide terrain data to an IG processor 180 for subsequent processing as discussed herein.

In the embodiment of FIG. 1, a runway data source 135 could comprise any source of runway data. A runway data source 135 may include, but is not limited to, a taxi navigation database 136, a flight navigation database 137, and other aircraft systems 138. A taxi navigation database 136, such as one disclosed in U.S. patent application Ser. No. 11/820,950, and a flight navigation database 137 may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs. A flight navigation database 137, such as one employed in a flight management system, may contain records which provide runway data.

Other aircraft systems 138 could comprise a source of runway data. For example, both a TAWS and an AAWS may utilize airport data which may contain, in part, runway data. As embodied herein, a runway data source 135 could provide runway data to an IG processor 180 for subsequent processing as discussed herein.

Input factors 140 are determining factors which may be used to define one or more landing distances based upon one or more landing profiles as disclosed in detail below. Input factors 140 may be provided by a plurality of aircraft systems or components thereof. Input factors 140 could include real-time system or sensor data, signal input from a plurality of aircraft systems or sensors, and information from any database or source. As embodied herein, an input factor 140 could provide data or a signal of any form containing information that may be provided to and received by an IG processor 180.

As embodied herein, input factors 140 could include those inputs defined above as being part of the navigation system 110 (e.g., geographic position 112, altitude 114, attitude 116, speed 118, vertical speed 120, heading 122, radio altitude 124, day/date/time 126, and navigation data quality 128). Moreover, any input provided by a navigation system 110 could be considered an input factor for the purposes of the embodiments herein. In other words, a navigation system 110 may be considered as providing a subset of input factors 140. The presentation of the specific inputs from navigation system 110 should not be construed as an exclusion or limitation to input factors 140. As embodied herein, input factors 140 may include information from any data or information source available to the IG processor 180 including, but not limited to, a terrain data source 130 and a runway data source 135. In other words, a terrain data source 130 and a runway data source 135 may be considered as sources providing a subset of input factors 140. The presentation of a terrain data source 130 and a runway data source 135 should not be construed as an exclusion or limitation to input factors 140.

In an embodiment herein, input factors 140 may be selected by a manufacturer or end-user as a determining factor for one or more criteria used in an equation which could be employed in the definition of a landing profile. A landing profile may be defined by an equation containing one or more selected criteria, each of which may comprise one or more input factors 140.

In another embodiment herein, input factors 140 may be selected by a manufacturer or end-user as a determining factor for one or more criteria used in an equation which could be employed in the definition of a landing profile to determine landing distance. As embodied herein, a landing profile could provide the basis for determining an air distance and a rollout distance. An air distance and a rollout distance may be defined by at least one equation containing one or more selected criteria, each of which may comprise one or more input factors 140.

When included in an equation, data representative of input factors 140 may be acquired by or through aircraft systems and sensors as discussed above and be provided as input to an IG processor 180. When received, the IG processor 180 may process the data in accordance with a landing profile algorithm that could contain the equation or equations defining an air distance, a rollout distance, or both. As a result, the IG processor 180 may determine a landing distance based upon the application of the real-time dynamic or static input factors 140.

One or more landing profiles may be defined using one or more selected criteria, each of which may be dependent on one or more input factors 140. The application of such criteria and input factors 140 by an IG processor 180 may determine a landing distance representative of real-time predictable and achievable aircraft performance using input factors 140. Although a manufacturer or end-user may define a landing profile using one criterion such as an aircraft's maximum gross weight (as will be discussed below in detail) that may be independent of input factors 140, the advantages and benefits of the embodiments herein exploit the ability of an IG processor 180 to receive a plurality of available input factors 140, apply them to a landing profile defined and contained in an algorithm, and determine a landing distance unique to actual conditions of flight operations as measured by the values of the input factors 140.

In one profile, a landing distance could be based upon, in part, an air distance determined using an assumed reference point located 50 feet above the threshold and an assumed airspeed that is equal to 1.3 times the stall speed of the aircraft in a landing configuration at maximum gross weight with no wind. Landing distance could be based upon, in part, a maximum rollout distance to a rollout point where a pilot may apply an assumed minimal use of braking, aerodynamic drag, or both if there is runway available. In another profile, landing distance could be based upon, in part, a minimum rollout distance that could assume a continuous peak deceleration through an assumed extensive use of deceleration systems installed in an aircraft.

To provide a simple example of how input factors 140 may be used in the embodiments herein, suppose a landing profile is defined with criteria comprising pressure altitude, temperature, headwind component, runway gradient or slope, and weight. Those skilled in the art understand that air distance (assumed to be a distance between a runway threshold and touchdown point) may be affected by a plurality of factors including, but not limited to, pressure altitude, temperature, headwind component, weight, and rollout distance; moreover, rollout distance could be affected by a plurality of factors including, but not limited to, headwind component, runway gradient or slope, and weight. Here, determining factors representing altitude 114, speed 118, headwind component 144, temperature 146, runway gradient (which could be obtained from a runway data source 135), and current weight 156 may be provided as input factors 140 to IG processor 180 for subsequent processing in accordance with the criteria that defines the landing profile. An IG processor 180 is able to define a landing distance comprised of an air distance and a rollout distance that is real-time because it is based upon input factors 140.

In the following paragraphs, other examples of criteria and performance factors are provided to illustrate the ability with which a manufacturer or end-user may define a landing profile as embodied herein. These illustrations are intended to provide exemplary criteria and performance factors that may be used in a runway visual aid generating system 100, and are not intended to provide a limitation to the embodiments discussed herein in any way, shape, or form.

In one example, a maneuver profile could include criteria related to limiting the vertical or the horizontal distances of a landing profile. If so, input factors 140 could include, but are not limited to, aircraft position, speed 118, vertical speed 120, heading 122, radio altitude 124, and landing threshold height, each of which could be provided by a navigation system 110 and a runway data source 135. In another example, a landing profile could include meteorological or environmental criteria including, but not limited to, air density 142 and headwind component 144 factors, where air density 142 may be determined by such factors as altitude 114, temperature 146, barometric pressure 148, and dew point 150, and headwind component 144 may be determined by such factors as heading 122, wind direction 152, and wind speed 154. As noted above, input factors 140 may include some of those inputs provided to an IG processor 180 by a navigation system 110, even though they are not enumerated under item 140 of FIG. 1; input factors that could affect the performance of the aircraft may include some inputs that are provided by any aircraft system other than a navigation system 110. As embodied herein, one or more input factors 140 could be included in the computation of another input factor. For instance, headwind component 144 could have been considered in a computation of speed 118, and barometric pressure 148 could have been considered in a computation of altitude 114. In such instances, an IG processor 180 may be programmed to accept only one of these factors.

In another example, a maneuver profile could include weight and balance criteria. If so, input factors 140 could include, but are not limited to, data representative of aircraft empty weight 156, center of gravity ("CG") 158, weight of fuel 160, weight of cargo 162, weight of passengers 164, and number of passengers and crew 166 (for which a standard weight can be applied). In another example, a landing profile could include aircraft landing configuration and system criteria. If so, input factors 140 could include, but are not limited to, data representative of an aircraft's flaps and slats 168, spoilers 170, speed brake 172, landing gear 174, and thrust reverser 176 configurations. In another example, a maneuver profile could include engine performance criteria. If so, input factors 140 could include, but are not limited to, data representative of engine performance or status 178 or available thrust. In another example, a landing profile could include criteria related to determination of day and night where, for instance, an airport is closed during specified hours; in such instance, a landing profile could include instructions inhibiting the determination of landing distance for a runway where the airport is closed. If so, input factors could include, but are not limited to, geographic position 112 and day/date/time 126.

In an embodiment of FIG. 1, an IG processor 180 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An IG processor 180 may be driven by the execution of software or computer instruction code containing algorithms developed for the specific functions embodied herein. An IG processor 180 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, an IG processor 180 could be a processor(s) used by or in conjunction with any other system of the aircraft including, but not limited to, a processor(s) associated with a vision system such as a synthetic vision system ("SVS"), an enhanced vision system ("EVS"), a combined SVS-EVS, a flight management computing system, a TAWS, an AAWS, one or more display units, or any combination thereof.

In an embodiment of FIG. 1, an IG processor 180 may generate an image data set comprising terrain image data representative of terrain information and runway data representative of at least one runway surface and runway markings. An IG processor 180 could receive terrain data received from a terrain data source 130. If the terrain data is not terrain image data, the IG processor 180 could determine terrain image data by determining the position where each terrain cell would appear on the screen of a display unit; for example, the determination of position could include a scaling component to convert "world space" (of the view outside the aircraft) to "screen space." An IG processor 180 could determine topographical colors similar to those depicted on standard aeronautical charts based upon the terrain data. The three-dimensional perspective view and topographical coloring represented by terrain image data presents an alternative view to the "blue/brown" electronic attitude feature used in classic electronic PFDs, the creation of the perspective view and employment of a coloring scheme are known to those skilled in the art.

Additionally, an IG processor 180 could receive runway data received from a runway data source 135. The IG processor could determine visual aid data associated with the runway data. An IG processor 180 could determine visual aid data by determining the position where at least one visual aid would appear on the screen of a display unit; for example, a determination of the position made by an IG processor 180 could include a scaling component to convert "world space" to "screen space." Then, an IG processor 180 could ensure that the visual aid data will provide a sufficient contrast with the terrain data and symbology of flight information. Then, the visual aid data may be combined with the terrain image data and runway data to form an image data set that will be provided to display units 190 comprising an HDD unit 192, a HUD unit 194, or both for presentation to a pilot or flight crew.

In an embodiment of FIG. 1, an IG processor 180 may receive input data from various systems including, but not limited to, a navigation system 110, a terrain data source 130, a runway data source 135, and input factors 140. An IG processor 180 may be operatively coupled to these to facilitate the receiving of input data; as embodied herein, operatively coupled may be considered as interchangeable with electronically coupled. An IG processor 180 may also be operatively coupled to display units 190 and crew alerting system 195 to facilitate, in part, the providing of output data to a display unit such as, but not limited to, an Head-Down Display ("HDD") unit 192 and/or a Head-Up Display ("HUD") unit 194. It is not necessary that a direct connection be made; instead, such receipt of input data and the providing of output data could be provided through, but not limited to, a data bus, a wireless network, or any other suitable means.

In a embodiment of FIG. 1, display units 190 could include any unit that provides symbology of tactical flight information. As embodied herein, tactical flight information could be information relevant to the instant or immediate control of the aircraft, whether the aircraft is in flight or on the ground. Display units may include, but are not limited to, HDD 192 units and HUD 194 units. An HDD unit 192 is typically a unit mounted to an aircraft's flight instrument panel located in front of a pilot and below the windshield and the pilot's field of vision. An HDD unit 192 could display the same information found on a primary flight display ("PFD"), such as "basic T" information (i.e., airspeed, attitude, altitude, and heading). Although it may provide the same information as that of a PFD, an HDD unit 192 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. An HDD unit 192 is designed to provide flexible configurations which may be tailored to the desired configuration specified by a buyer or user of the aircraft.

Figure 2A:
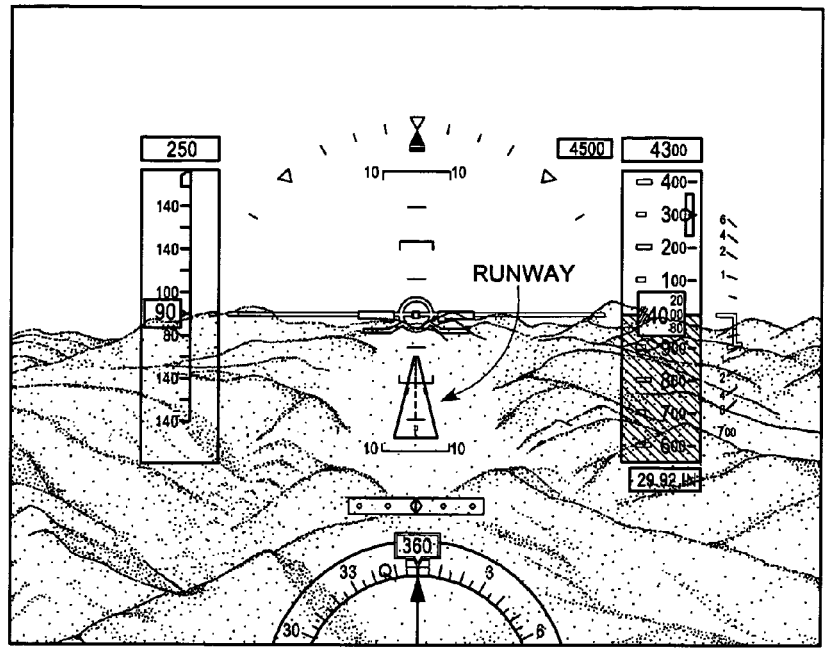
FIGS. 2A and 2B depict exemplary illustrations of images on an HDD unit and a HUD unit, respectively, depicting terrain, a runway, and symbology providing tactical flight information.

FIG. 2A provides an exemplary depiction of an HDD unit for presenting tactical information to the pilot or flight crew against the background of a three-dimensional image of terrain and sky; an HDD unit could be employed as a display unit in a synthetic vision system, an enhanced vision system, or combination of both. FIG. 2A provides an exemplary depiction of an HDD unit presenting an image of a runway located within a three-dimensional display of terrain. It should be noted that the tactical information depicted on the HDD unit and has been made minimal for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
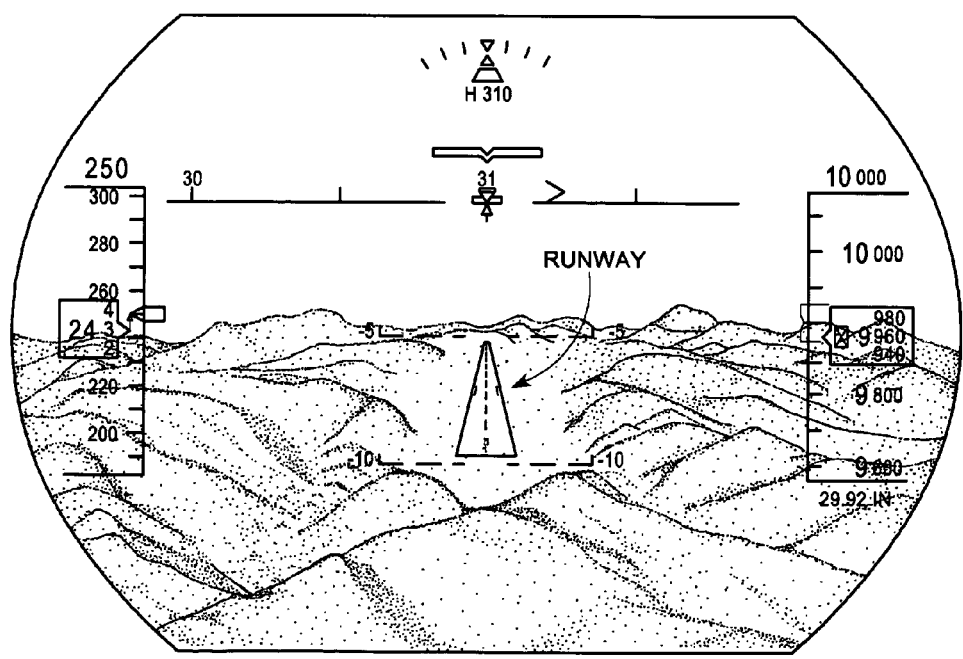
Figure 3A:
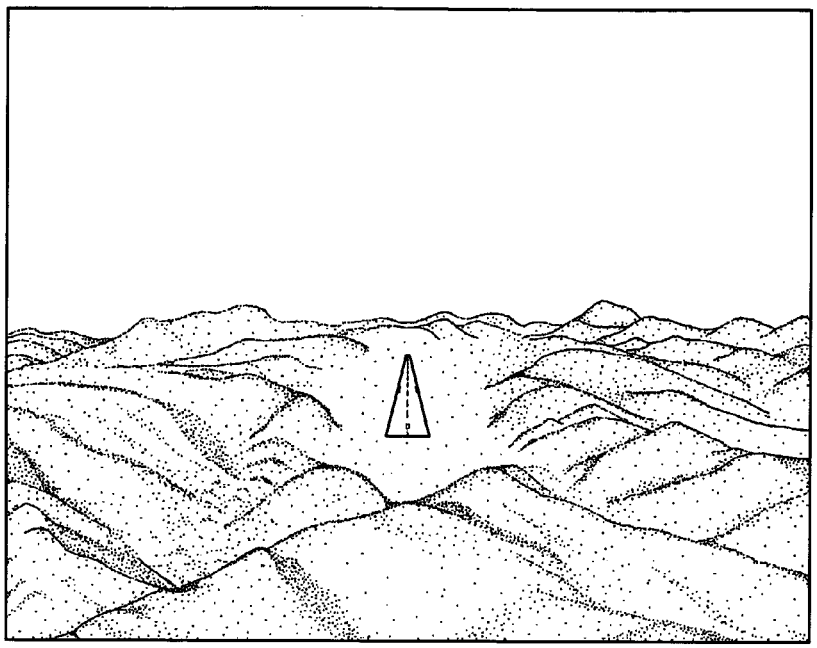
FIGS. 3A and 3B depict exemplary illustrations of the images in FIGS. 2A and 2B without the depiction of tactical flight information symbology.
Figure 3B:
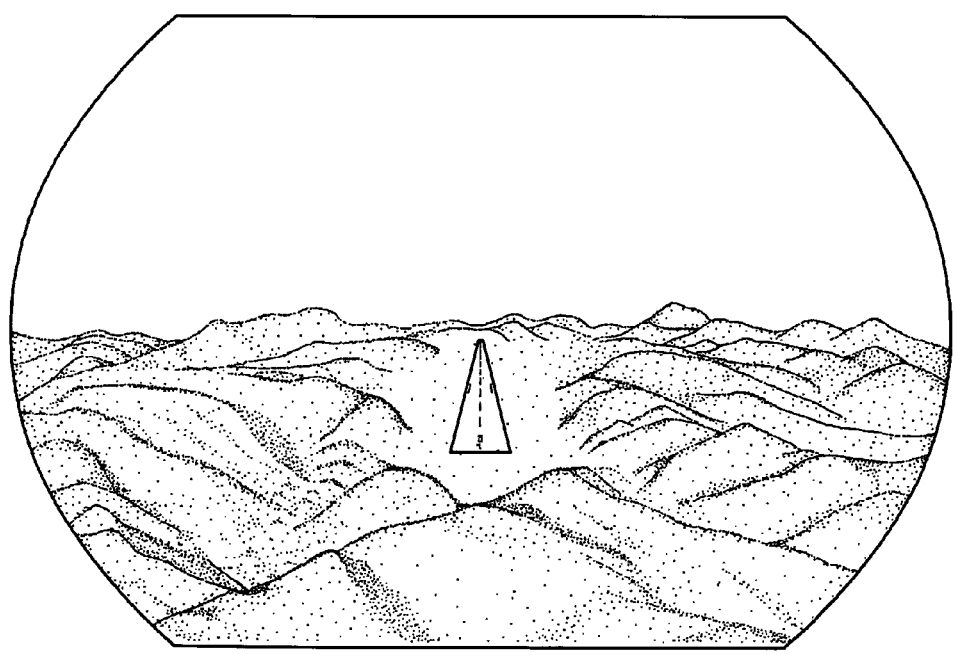
Figure 5A:
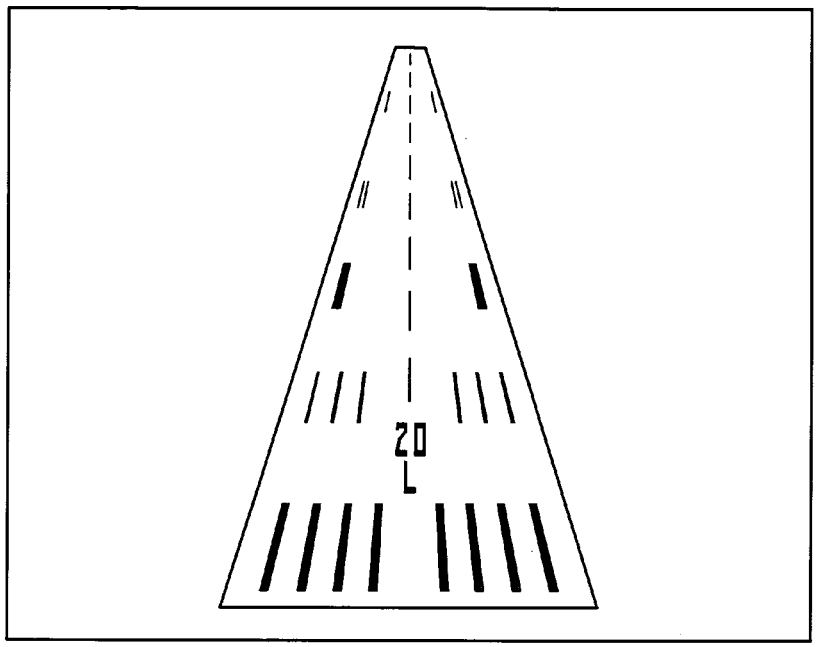
Figure 5B:
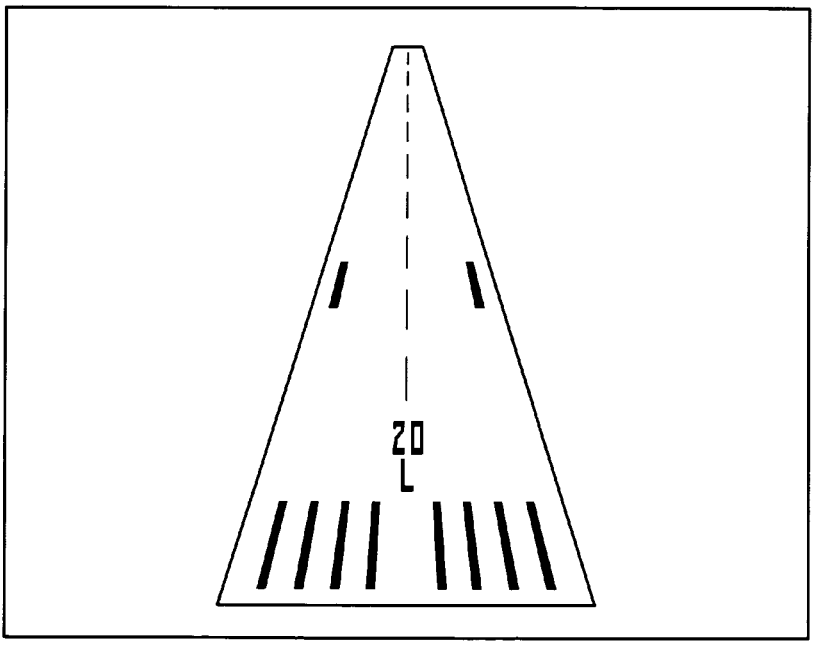
Figure 5C:
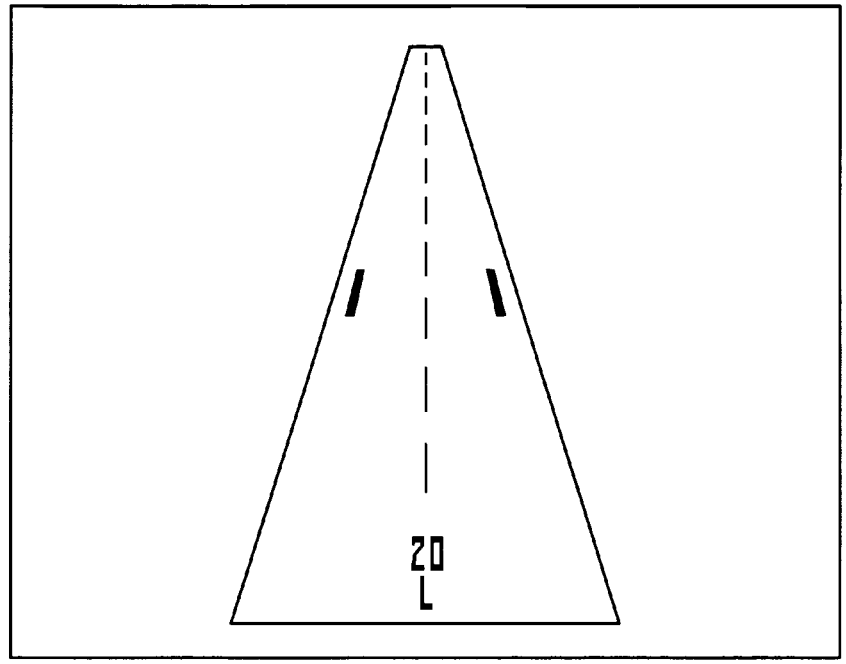
Figure 5D:
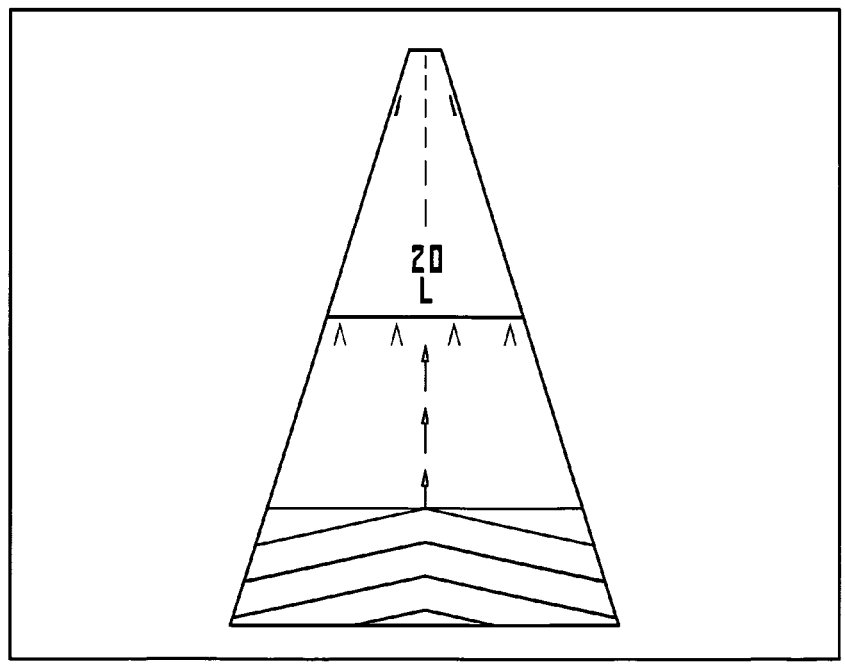

Returning to FIG. 1, a HUD unit 194 provides tactical information to the pilot or flight crew, in the pilot's forward field of view through the windshield, eliminating transitions between head-down and head-up flying. Similar to an HDD unit 192, a HUD unit 194 may be tailored to the desired configuration specified by a buyer or user of the aircraft FIG. 2B provides an exemplary depiction of a HUD unit for presenting tactical information to the pilot or flight crew against the background of a three-dimensional image of terrain and sky; a HUD unit 194 could be employed as a display unit in a synthetic vision system, an enhanced vision system, or combination of both. FIG. 2B provides an exemplary depiction of a HUD unit presenting an image of a runway located within a three-dimensional display of terrain. It should be noted that the tactical information depicted on the HUD unit 194 has been made minimal for the sake of presentation and is not indicative of the plurality of indications or information with which it may be configured. FIGS. 3A and 3B provide examples of the same images on the HDD and HUD units shown in FIGS. 2A and 2B, respectively, without the presentation of tactical information. For the sake of clarity in the remaining discussion herein, HDD units without tactical information will be presented.

Returning to FIG. 1, a crew alerting system 195 includes those systems that provide, in part, aural, visual, and/or tactile stimulus presented to attract attention and convey information regarding system status or condition. A crew alerting system 195 may include, but is not limited to, an aural alert unit for producing aural alerts, a display unit for producing visual alerts, and a tactile unit for producing tactile alerts. Aural alerts may be discrete sounds, tones, or verbal statements used to annunciate a condition, situation, or event. Visual alerts may be information that is projected or displayed on a cockpit display unit to present a condition, situation, or event to the pilot. Tactile alerts may be any tactile stimulus to present a condition, situation, or event to the pilot. In addition, alerts may be based on conditions requiring immediate crew awareness or attention. Caution alerts may be alerts requiring immediate crew awareness in which subsequent corrective action will normally be necessary. Warning alerts may be alerts for detecting a threat that requires immediate crew action. Both caution and warning alerts may be presented as aural alerts, visual alerts, tactile alerts, or in any combination thereof. When presented visually, one or more colors may be presented on a display unit indicating one or more levels of alerts. For instance, amber or yellow may indicate a caution alert and red may indicate a warning alert.

In one embodiment, an aural alert could call out "CAUTION, LANDING DISTANCE" when the conditions for a caution alert have been met or "WARNING, LANDING DISTANCE" when the conditions for a warning alert have been met. In another embodiment, a visual message could display "CAUTION, LANDING DISTANCE" text when the conditions for a caution alert have been met or "WARNING, LANDING DISTANCE" text when the conditions for a warning alert have been met. A visual message could be displayed on HDD unit 192, HUD unit 194, or any other display unit. In another embodiment, a text message could be displayed in color, e.g., the "CAUTION, LANDING DISTANCE" text could be displayed in amber and the "WARNING, LANDING DISTANCE" could be displayed in red. In another embodiment, the condition causing the alert could be indicated visually, aurally, and/or tactilely, in any combination. In another embodiment, the aural and visual alerts could be presented simultaneously. In another embodiment, the alert could be issued along with one or more recommendations and/or guidance information for responding to the alert condition including, for example, the aural and/or visual indication of "LANDING LONG, GO AROUND."

The advantages and benefits of the embodiments discussed herein may be illustrated by showing examples of how situational awareness of a runway environment could be enhanced by displaying runway indicators on a display unit comprising of defined runway markings of a runway based upon a category assigned to the runway by an aviation governing authority. The drawings of FIG. 4 illustrate standards applicable for runway markings issued by the United States Federal Aviation Administration ("FAA") and found in Advisory Circular AC 150/5340-1J, an FAA Advisory Circular entitled "Standards for Airport Markings" and dated Apr. 29, 2005. The remaining discussion herein will be drawn to these FAA standards for the purpose of simplifying the discussion only; however, the embodiments are neither limited nor restricted to airports of the United States or those with governing oversight of the FAA. It is known to those skilled in the art that aviation governing authorities throughout the world may have developed standards unique to their respective jurisdictions which may or may not employ a similar marking scheme. The embodiments disclosed herein could include all runway markings standards or schemes that could be developed or employed.

The choice of runway markings employed for a specific runway could depend on a category of the runway. The categorization of a runway could be based upon the presence of an instrument approach procedure assigned to the runway. FIG. 4A illustrates the runway markings of a precision runway, FIG. 4B illustrates the markings of a non-precision runway, and FIG. 4C illustrates the markings of a visual runway. A precision runway could be a runway having an existing instrument approach procedure utilizing air navigation facilities with both horizontal and vertical guidance for which a precision approach has been approved. A non-precision runway could be a runway having an existing instrument approach procedure utilizing air navigation facilities with only horizontal guidance for which a straight-in or side-step non-precision approach procedure has been approved. A visual runway could be a runway having no straight-in instrument approach procedure.

A runway data source 135 may be employed in determining the category of a runway for the purposes of runway marking. In one embodiment, a runway data source 135 could be any database in which a runway identification field corresponds to a runway markings field which categorizes the runway as either a precision runway, non-precision runway, or visual runway. In another embodiment, record fields from a flight navigation database 137 employing standards of the ARINC 424 specification could be used to derive a runway marking category. In one example, an "IFR Capability" field of an airport record could be used to determine the presence of any published instrument approach procedures; if no instrument approach procedures have been published, then each runway at the airport could be categorized as a visual runway.

In another example, an "ILS/MLS/GLS Category" field of a runway record could be used to indicate the presence of a precision approach runway; if one is present, then the runway could be assigned the markings of a precision runway. In another example, the "Approach Route Identifier" field of an airport approach route record could be used to identify whether an established instrument approach procedure of a runway is a precision or non-precision approach. If the procedure is a precision approach, then the runway could be assigned the markings of a precision runway; if the procedure is not a precision approach, an "Approach Route Qualifier" field of an airport approach route record could be used to identify whether the procedure has straight-in minimums. If the procedure has straight-in minimums, then the runway could be assigned the markings of a non-precision runway; if the procedure does not have straight-in minimums, then the runway could be assigned the markings of a visual runway.

Although the preceding discussion has drawn from record fields established in accordance with a specific ARINC specification, the embodiments herein are not limited to the specification or those specific record fields discussed. Rather, the preceding discussion was used to provide an example of how a field or fields of a specific record could be used to derive a runway marking category.

The drawings of FIG. 4 illustrate runway markings that could be part of an image displayed by an HDD unit 192, a HUD unit 194, or both. Runway designation markings 202, 204, and 206 could identify a runway by a number that is a whole number nearest one-tenth of the magnetic azimuth when viewed from the direction of approach. For example, the runway designation "20" as shown would indicate the magnetic azimuth of the runway is approximately 200 degrees. Runway designation could be supplemented with a letter for parallel runways, and as shown, the runway designation "L" would indicate this surface is a left runway and that there is a separate, parallel runway "20R" to the right of it.

Runway centerline markings 208, 210, and 212 could identify the physical center of a runway and provide alignment guidance during takeoff and landing operations. Runway centerline markings 208, 210, and 212 are located along the centerline of the runway between runway designation markings and could comprise of a line of uniformly spaced stripes and gaps. Runway threshold markings 214 and 216 could identify the beginning of a runway that is available for landing and could comprise of eight longitudinal stripes of uniform dimensions spaced symmetrically about the runway centerline. Runway aiming point markings 218, 220, and 222 could serve as a visual aiming point for landing operations and could comprise two rectangular markings. Runway touchdown zone markings 224 (comprising items 224-A, 224-B, and 224-C) could identify the touchdown zone for landing operations and could be coded to provide distance information; runway touchdown zone markings 224 could be comprised of groups of one, two, and three rectangular bars symmetrically arranged in pairs about the runway centerline, where the number of pairs could depend upon on the length of the runway and the requirement for touchdown zone markings on the other end of the runway.

Besides runway surfaces, other non-runway surfaces may be depicted. As shown in FIG. 4D, a displaced threshold 226 is present and identified with arrows and arrowheads, and blast pad or stopway 228 could be identified with chevrons. A runway threshold bar 230 could delineate the beginning of the runway that is available for landing, and a demarcation bar 232 could delineate the boundary between a displaced threshold 226 and a blast pad or stopway 228.

For the purposes of illustration, depictions of the various runway markings on an aircraft display unit are shown in the drawings of FIG. 5. As shown in FIG. 5A, the runway markings of a precision runway are illustrated on an HDD unit. As shown in FIG. 5B, the runway markings of a non-precision runway are illustrated on an HDD unit. As shown in FIG. 5C, the runway markings of a visual runway are illustrated on an HDD unit. As shown in FIG. 5D, surface markings of a displaced threshold and blast pad or stopway are illustrated on an HDD unit.

In the embodiments of FIG. 6A, a landing profile 240 of an aircraft 242 is depicted from which a landing distance 244 of a runway 246 could be determined (runway markings have been intentionally omitted for the sake of clarity). A landing profile 240 could comprise a reference point 248, touchdown point 250, and rollout point 252. As embodied herein, a point or alert point (discussed below) on a runway is not limited to a point per se but may be designated by a manufacturer or end-user as any area or portion on a runway. Landing distance 244 could be a horizontal distance needed to land as measured between a reference point 248 and a rollout point 252, part of which may be determined as a function of angle of descent 256. In an embodiment, the reference point 248 could be located above a runway threshold 258 as shown in FIG. 6A. In another embodiment, a reference point could be specially defined or configured by a manufacturer or end-user. Landing distance 244 could include an air distance 260 plus a rollout distance 262; the air distance 260 could be the horizontal distance required to travel from a reference point 248 to a touchdown point 250, and a rollout distance 262 could be the distance between a touchdown point 250 and a rollout point 252. In one embodiment, a rollout point 252 could be that point where the aircraft arrives at a complete stop. In another embodiment, a manufacturer or end-user could configure a rollout point 252 to be some other parameter such as, but not limited to, a safe speed designated for exiting the runway.

As discussed above, a landing profile could provide the basis for determining landing distance as a function of an air distance and a rollout distance. An air distance and a rollout distance may be defined by one or more equations containing one or more selected criteria, each of which may comprise one or more input factors 140. Input factors 140 may be selected by a manufacturer or end-user as a determining factor for one or more criteria used in an equation which could be employed in the definition of a landing profile to determine landing distance. There could be many input factors 140 available to a manufacturer or end-user from which to configure or define one or more landing profiles from which to determine a real-time landing distance of each landing profile. After such determination has been made, an indication corresponding to the landing distance of the landing profile may be presented on a display unit to convey real-time landing information to the pilot or aircrew of an aircraft.

The advantages and benefits of the embodiments discussed herein may be illustrated by showing examples of how situational awareness of a runway environment could be enhanced with one or more configurable landing profiles and the application of one or more input factors to the landing profile. These examples are not intended to provide a limitation to the embodiments discussed herein in any way, shape, or form.

As embodied in FIG. 6B, a manufacturer or end-user may decide to define two landing profiles based upon a plurality of input factors. One profile may determine a landing distance corresponding to a maximum rollout distance, i.e., maximum rollout landing profile 270. Another profile may determine a landing distance corresponding to a minimum rollout distance, i.e., minimum rollout landing profile 272. A maximum landing distance corresponding to an air distance 274 and a rollout distance 276 could be measured to a rollout point 278 with an assumption that a pilot will exert a minimal use of braking or aerodynamic drag. A minimum landing distance corresponding to an air distance 274 and a rollout distance 280 could be measured to a rollout point 282 with an assumption that a pilot will exert continuous peak deceleration through an extensive use of deceleration systems installed in an aircraft such as, but not limited to, a braking system (which could include an anti-skid system), a spoiler system, and a thrust reversing system; or any combination thereof.

A manufacturer or end-user may decide to define not only two landing profiles based upon a plurality of input factors but also at least one rollout alert point 284 corresponding to an alert distance 286 from a runway threshold. A rollout alert point could be used as the basis for providing the pilot or air crew an alert associated with the runway environment. For example, if an IG processor 180 determines a maximum rollout profile 270 will extend beyond a rollout alert point 284 (based upon the application of one or more input factors) or an air distance 274 plus a maximum rollout distance 276 will exceed an alert distance 286, a caution alert could be generated which, in turn, could cause a visual alert "ROLLOUT DISTANCE" to be displayed in amber or yellow on a display unit, an aural alert "CAUTION ROLLOUT DISTANCE" to be sounded, a tactile alert to be generated, or any combination thereof. The presentation of any visual alert could be presented on any display unit including, but not limited to, an HDD unit and a HUD unit.

In another example, if an IG processor 180 determines a minimum rollout profile 272 will extend beyond a rollout alert point 284 or an air distance plus a minimum rollout distance 280 will exceed an alert distance 286, a warning alert could be generated which, in turn, could cause a visual alert "ROLLOUT DISTANCE" to be displayed in red on a display unit, an aural alert "WARNING ROLLOUT DISTANCE" to be sounded, a tactile alert to be generated, or any combination thereof.

A manufacturer or end-user may decide to use a rollout alert point 294 as the basis for providing the pilot or air crew another alert associated with the runway environment. In an example embodied in FIG. 6C, an IG processor 180 could determine the location of a touchdown point 290 of a maximum rollout profile 270 in which a rollout point 292 of the profile will extend beyond a rollout alert point 294; that is, a rollout distance 296 plus air distance 298 will exceed an alert distance, a distance measured between a threshold and the rollout alert point 294. If the landing profile 270 exceeds the alert rollout point 294 (based upon the application of one or more input factors) or an air distance 298 plus a rollout distance 296 will exceed the alert distance, a caution alert could be generated which, in turn, could cause a visual alert "TOUCHDOWN POINT" to be displayed in amber or yellow on a display unit, an aural alert "CAUTION TOUCHDOWN POINT" to be sounded, a tactile alert to be generated, or any combination thereof.

In another example, an IG processor 180 could determine the location of a touchdown point 300 of a minimum rollout profile 272 in which a rollout point 302 of the profile will extend beyond a rollout alert point 294; that is, a rollout distance 304 plus air distance 306 will exceed an alert distance, a distance measured between a threshold and the rollout alert point 294. If the landing profile 272 exceeds the alert rollout point 294 (based upon the application of one or more input factors) or an air distance 306 plus a rollout distance 304 will exceed the alert distance, a warning alert could be generated which, in turn, could cause a visual alert "TOUCHDOWN POINT" to be displayed in red on a display unit, an aural alert "WARNING TOUCHDOWN POINT" to be sounded, a tactile alert to be generated, or any combination thereof.

A manufacturer or end-user may decide to use a second alert point as the basis for providing the pilot or air crew another alert associated with the runway environment. In an example embodied in FIG. 6D, an IG processor 180 could determine a touchdown point 310 or 312 of a maximum rollout landing profile 270 or minimum rollout landing profile 272, respectively, will fall short of a threshold alert point 314 (based upon the application of one or more input factors); that is, an air distance 316 will be less than a threshold alert distance 318, a distance measured between a threshold and a threshold alert point 314. If a touchdown point falls short of a threshold alert point or an air distance will is less than a threshold alert distance 318, a caution alert could be generated which, in turn, could cause a visual alert "THRESHOLD POINT" to be displayed in amber or yellow on a display unit, an aural alert "CAUTION THRESHOLD POINT" to be sounded, a tactile alert to be generated, or any combination thereof.

In another example, a threshold alert point could be set to coincide with the beginning of the runway. If an IG processor 180 determines a touchdown point of a maximum rollout landing profile or minimum rollout landing profile will fall short of a threshold alert point (based upon the application of one or more input factors) or a negative air distance exists, a warning alert could be generated which, in turn, could cause a visual alert "TOO SHORT RUNWAY" to be displayed in red on a display unit, an aural alert "WARNING TOO SHORT" to be sounded, a tactile alert to be generated, or any combination thereof.

The advantages and benefits of the embodiments discussed herein may be illustrated by showing examples of how situational awareness of a runway environment could be enhanced by displaying runway indicators on a display unit based upon real-time data determined by applying one or more input factors to a user-configured landing profile. While the embodiments of the drawings of FIGS. 7 through 9 will be drawn to those discussed in the drawings of FIG. 6, the examples presented in the drawings of FIGS. 7 through 9 and discussed in the following paragraphs are not intended to provide a limitation to the embodiments discussed herein in any way, shape, or form.

Figure 7A:
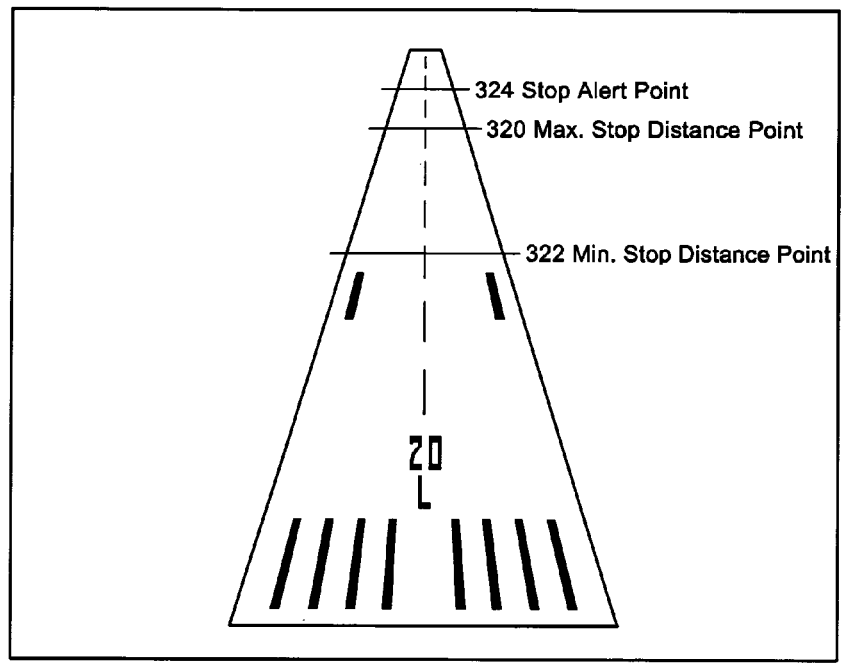

As embodied in the drawings of FIGS. 7 through 9, determinations made by an IG processor 180 based upon one or more landing profiles may be visually represented as indicators on any display unit depicting a runway environment. For example, in an embodiment of FIG. 7A, a manufacturer or end-user could elect to configure the depiction of the runway environment with three indicators where two indicators correspond to rollout points and a third indicator corresponds to an alert point on a runway. In this example, a rollout point has been defined to be a stop point, i.e., a point where the aircraft is predicted to come to a stop. As shown in FIG. 7A, a maximum stop distance Point indicator 320 and a minimum stop distance point indicator 322 corresponding to rollout points 278 and 282 of FIG. 6B could be depicted. The configuration could also define a stop alert point indicator 324 corresponding to rollout alert point 284.

It should be noted that, although the indicators shown in FIG. 7A (and the other drawings of FIGS. 7 through 9) are depicted with straight lines, a plurality of visual indicators is available to or configurable by a manufacturer or end-user including, but not limited to, brackets, arrows, pointers, blocks, and zones. Those skilled in the art will appreciate the ability and ease with which executable software code may be reprogrammed or modified by a manufacturer or end-user to facilitate a configuration of visual indicators selected by a manufacturer or end-user without affecting or expanding the scope of the embodiments discussed herein. The examples of visual indicators herein are provided to illustrate the ability with which a manufacturer or end-user may define a visual indicator as embodied herein. These illustrations are intended to provide examples of visual indicators, and are not intended to provide a limitation or an exhaustive list of the embodiments discussed herein.

Figure 7B:
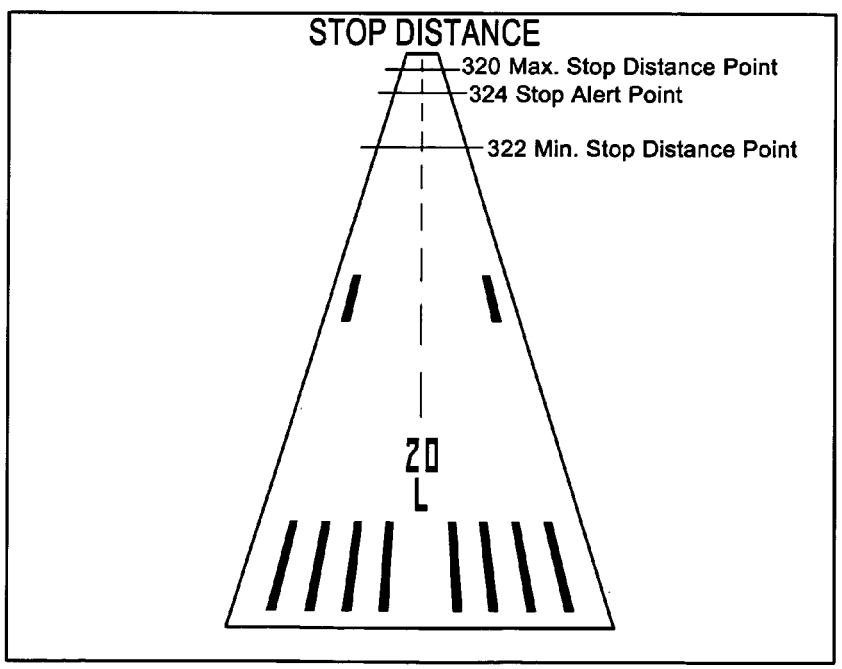

As shown in FIG. 7B, the maximum stop distance point indicator 320 has exceeded the stop alert point indicator 324, an event in which an amber or yellow caution alert "STOP DISTANCE" has been displayed. Moreover, the appearance of one or more indicators could be altered on such an event. For example, the color of an indicator could change. In another example, an indicator could flash intermittently or remain steady. Additionally, an indicator comprising a line could change its weight (i.e., thickness), pattern (e.g., solid, dashed, dotted, etc.), or both.

Figure 7C:
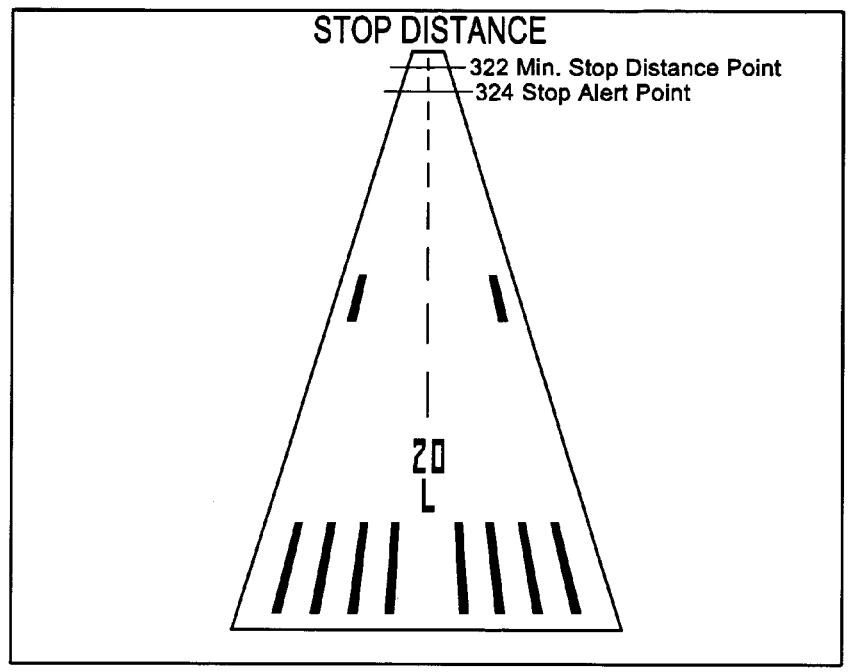

As shown in FIG. 7C, the minimum stop distance point indicator 322 has exceeded the stop alert point indicator 324, an event in which a red warning alert "STOP DISTANCE" has been displayed. As discussed above, the appearance of one or more indicators could be altered on the occurrence of such an event.

Figure 8A:
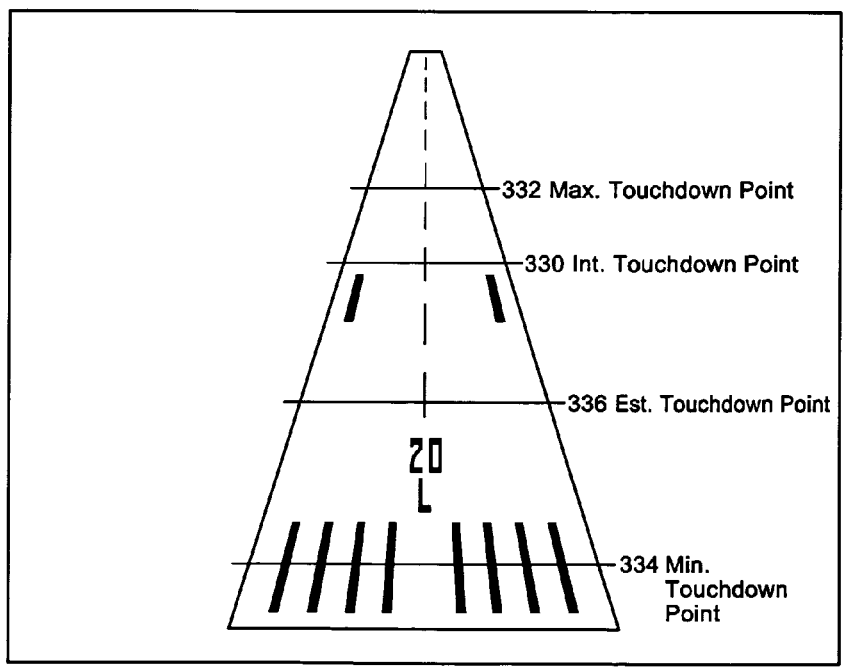
Figure 8B:
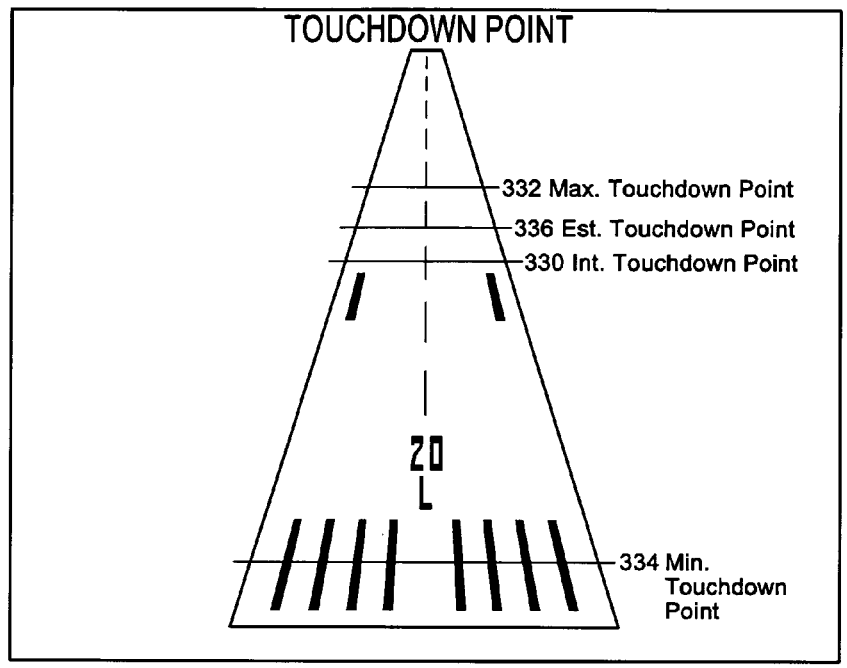
Figure 8C:
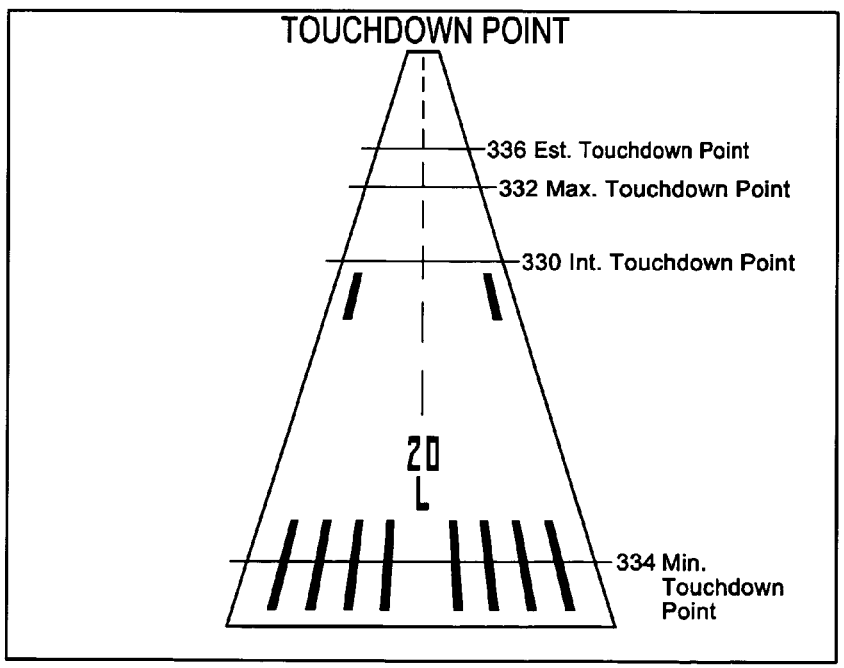
Figure 8D:
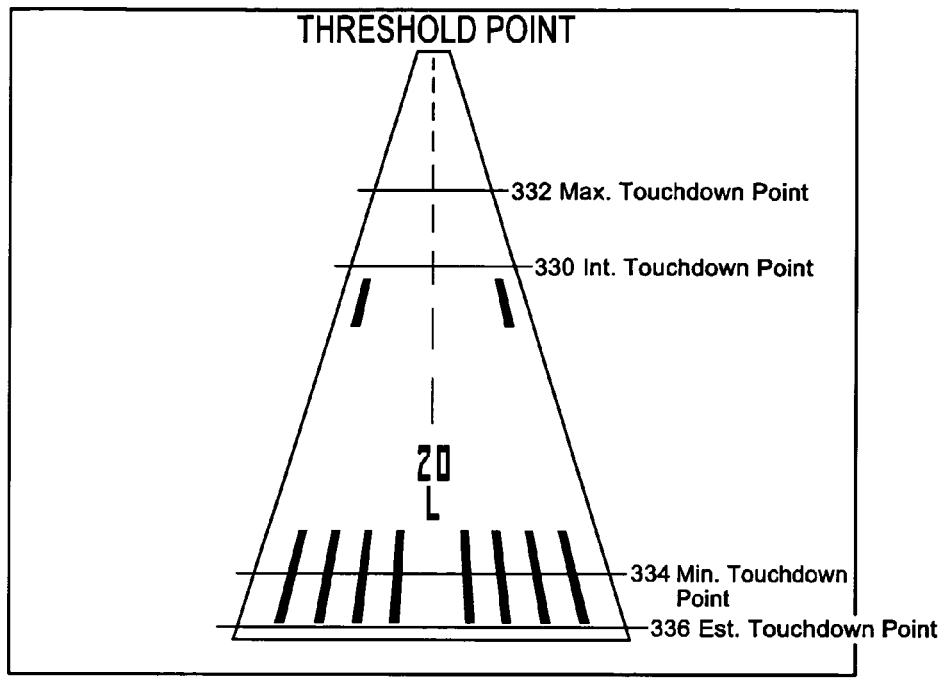
Figure 8E:
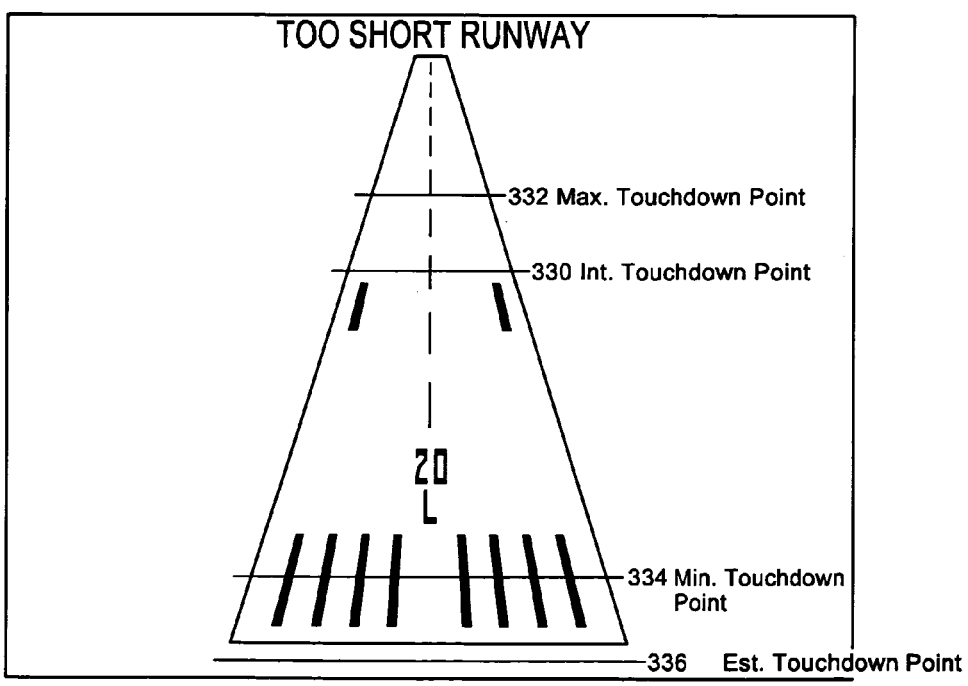

In an embodiment of FIG. 8A, a manufacturer or end-user could elect to configure the depiction of the runway environment with four indicators corresponding to touchdown points. As shown in FIG. 8A, an intermediate touchdown point indicator 330 and a maximum touchdown point indicator 332 corresponding to touchdown points 290 and 300 of FIG. 6C could be depicted. A minimum touchdown point indicator 334 corresponding to a threshold alert point 314 of FIG. 6D could also be depicted. In addition, an estimated touchdown point indicator 336 based upon the touchdown point of a landing profile could be depicted. As shown in FIG. 8B, the estimated touchdown point indicator 336 has exceeded the intermediate touchdown point indicator 330, an event in which an amber or yellow caution alert "TOUCHDOWN POINT" has been displayed. As shown in FIG. 8C, the estimated touchdown point indicator 336 has exceeded the maximum touchdown point indicator 332, an event in which a red warning alert "TOUCHDOWN POINT" has been displayed. As shown in FIG. 8D, the estimated touchdown point indicator 336 has preceded the minimum touchdown point indicator 336, an event in which an amber or yellow caution alert "THRESHOLD POINT" has been displayed. As shown in FIG. 8E, the estimated touchdown point indicator 336 has preceded the beginning of the runway, an event in which a red warning alert "TOO SHORT RUNWAY" has been displayed. As discussed above, the appearance of one or more indicators could be altered on the occurrence of one or more of the preceding events.

The information depicted in the drawings of FIG. 8 could be displayed with alternative indicators. For example, in an embodiment of FIG. 9A, a touchdown zone indicator 340 has been configured as a two-tiered indicator where a first tier has been bounded by an intermediate touchdown point 342 and a maximum touchdown point 344, and a second tier has been bounded by the intermediate touchdown point 342 and a minimum touchdown point 346. Also, an estimated touchdown point indicator 348 based upon the touchdown point of a landing profile could be depicted, and as shown, falls within the second tier of the touchdown zone indicator 340. As embodied herein, the visual appearance of the touchdown zone indicator 340 could be enhanced with visual effects such as, but not limited to, shading, transparency, translucency, opacity, texture-mapping, bump-mapping, fogging, shadowing, patterns, colors, or any combination thereof.

Figure 9A:
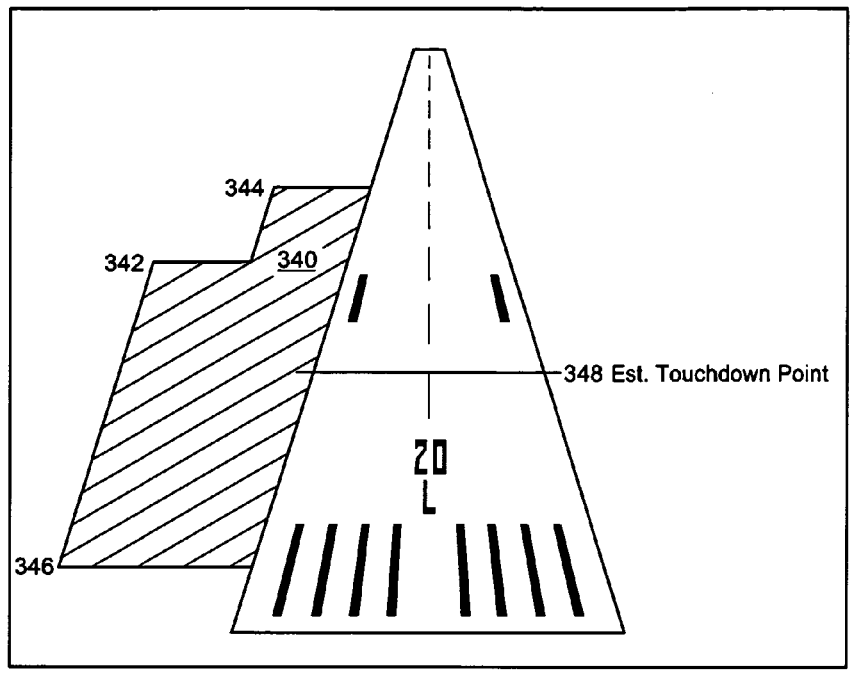
Figure 9B:
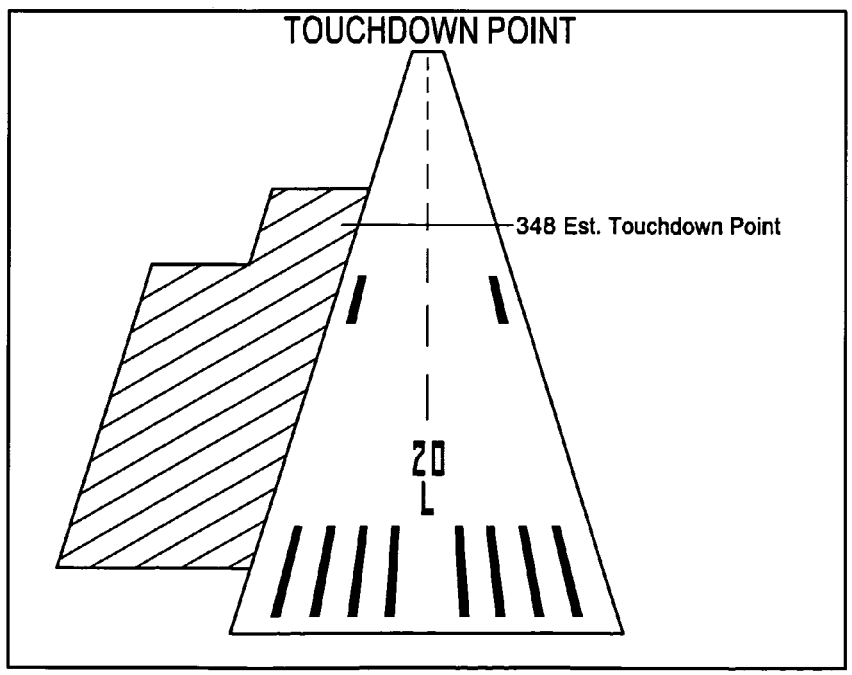

As shown in FIG. 9B, the estimated touchdown point 348 falls within the first tier of the touchdown zone indicator 340 (exceeding the intermediate touchdown point), an event in which an amber or yellow caution alert "TOUCHDOWN POINT" has been displayed. Moreover, the appearance of the touchdown zone indicator 340 could be altered on such an event either in part or in whole. For example, the color of the touchdown zone indicator could change, and the change could be applied to one or both tiers. In another example, the touchdown zone indicator could flash intermittently or remain steady either in part or in whole. In another example, the enhancing visual effects of the touchdown zone indicator 340 could be altered either in part or in whole.

Figure 9C:
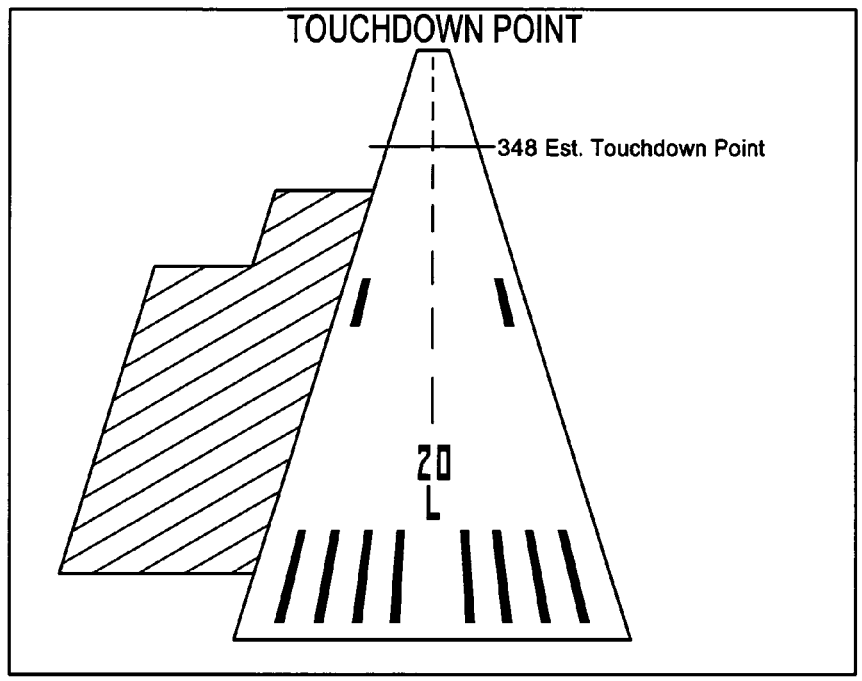
Figure 9D:
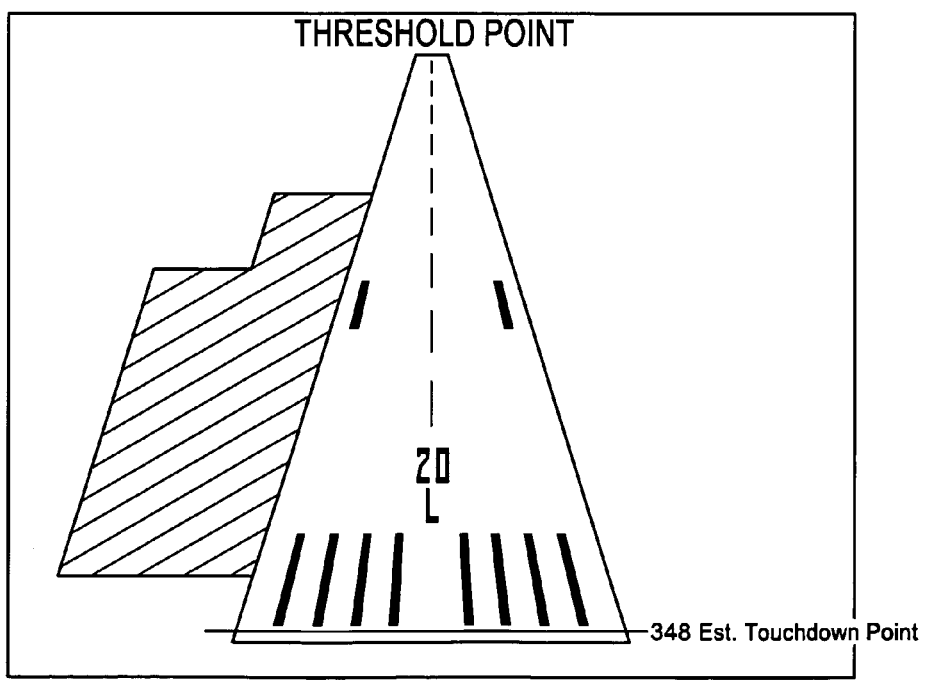
Figure 9E:
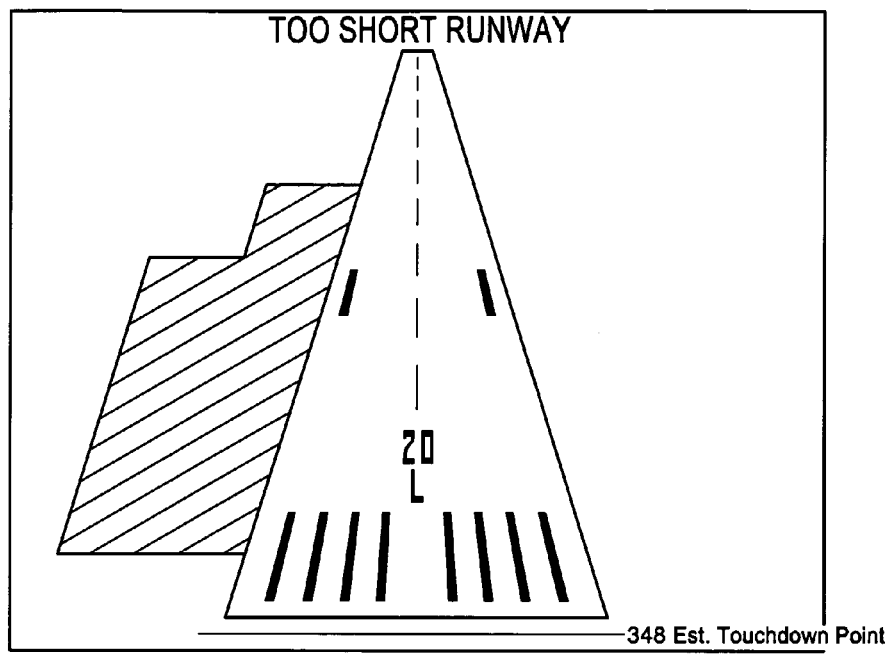

As shown in FIG. 9C, the estimated touchdown point 348 falls outside of the touchdown zone indicator 340 (exceeding the maximum touchdown point), an event in which a red warning alert "TOUCHDOWN POINT" has been displayed. As shown in FIG. 9D, the estimated touchdown point 348 falls outside of the touchdown zone indicator 340 (preceding the minimum touchdown point), an event in which an amber or yellow caution alert "THRESHOLD POINT" has been displayed. As shown in FIG. 9E, the estimated touchdown point 348 falls outside of the touchdown zone indicator 340 (preceding the beginning of the runway), an event in which a red warning alert "TOO SHORT RUNWAY" has been displayed. As discussed above, the appearance of one or more indicators could be altered on the occurrence of one or more of the preceding events.

The advantages and benefits of the embodiments discussed herein may be illustrated by showing an example of how situational awareness of a runway environment could be enhanced by displaying indicators on a display unit depicting an extended runway centerline based upon real-time aircraft position and runway data. A depiction of an extended runway centerline aids the pilot as he or she attempts to align the approach path of the aircraft with the centerline of a distant runway. In an embodiment of FIG. 10, a visual indicator 350 comprising of a plurality of "upside-down T's" is depicted as extending from the beginning of a runway and in the same direction as the runway centerline; data representative of runway direction could be obtained or derived from airport data. As shown in FIG. 10, the "upside-down T's" aligned, providing runway alignment cues. As shown in FIG. 10, the "upside-down T's" are evenly spaced, providing distance to runway and relative approach cues. Also, the height of each "upside-down T" may be depicted proportionally to the distance to the threshold of the runway with the shortest height being closest to the threshold. As an aircraft approaches the runway the height of the "upside-down T's" decreases; by analogy, as an aircraft is on a precision instrument approach, the height of a glide slope decreases. Also, the height of each "upside-down T" may be depicted proportionally to the distance to the threshold of the runway with the shortest height being closest to the threshold. Alternatively, the upright portion of the "upside-down T" could point towards the threshold of the runway instead of pointing upward.

It should be noted that, although the visual indicator 350 of an extended runway centerline shown in FIG. 10 is depicted as a plurality of "upside-down T's," a plurality of visual objects is available to or configurable by a manufacturer or end-user including, but not limited to, lights, lines, brackets, arrows, pointers, and blocks. Moreover, the enhancing visual effects previously discussed could also be utilized. Those skilled in the art will appreciate the ability and ease with which executable software code may be reprogrammed or modified by a manufacturer or end-user to facilitate a configuration of visual objects selected by a manufacturer or end-user without affecting or expanding the scope of the embodiments discussed herein. The example of the extended centerline visual indicator was provided to illustrate the ability with which a manufacturer or end-user may define a visual indicator as embodied herein. This illustration was not intended to provide a limitation or an exhaustive list of the disclosed embodiments.

FIG. 11 depicts a flowchart 400 of an example of a method for generating at least one runway visual aid. The flowchart begins with module 402 with the receiving of navigation data by an IG processor 180 including data representative of the aircraft position and attitude in flight. The navigation data could be provided by a navigation system 110 to an IG processor, and position could comprise of geographic position (e.g., latitude and longitude coordinates) and altitude. As embodied herein, the receiving of data by an IG processor or the providing of data to an IG processor may include a step in which an IG processor performs a retrieval operation of such data. As embodied herein, a change in aircraft position could be used to determine the direction of a scene outside the aircraft.

The flowchart continues with module 404 with the receiving of terrain data and runway data. Terrain data may be received from a terrain data source 130. In one embodiment, terrain data of a scene outside the aircraft could be provided by a terrain database. In another embodiment, terrain data could be provided by other aircraft systems or components thereof including, but not limited to, an SVS, an EVS, a combined SVS-EVS, or a TAWS. Runway data of one or more runways located in the scene may be received from a runway data source 135. In one embodiment, runway data could be provided by a taxi navigation database. In another embodiment, runway data could be provided by a flight navigation database. In another embodiment, runway data could be provided by other aircraft systems or components thereof including, but not limited to, a TAWS and/or an AAWS.

In an additional embodiment, input factor data may be received from one or more sources of input factor data. Input factor data could comprise of data representative of at least one input factor. In addition to those included as input factors 140 in FIG. 1, input factors could also include, but are not limited to, input from a navigation system 110, a terrain data source 130, a runway data source 135, or any combination thereof.

The flowchart continues with module 406 with determining of visual aid data. Visual aid data may be data representative of one or more visual aids that could be displayed on a display unit such as an HDD unit or a HUD unit. Each visual aid represented in the visual aid data may be derived from data received from at least one data source.

In one embodiment, visual aid data may comprise data representative of runway markings contained in runway data or derived by an IG processor using runway data. Runway markings could correspond to runway surfaces markings established by an aviation-governing authority, where such authority could place each runway into a plurality of runway categories. As embodied herein, a runway data record field in a runway database could include a category of the runway based upon the categorization assigned by an aviation-governing authority, or a plurality of data record fields in a runway database could be cross-referenced to derive the category of a runway assigned by an aviation-governing authority if such categorization is based upon an established approach procedure.

In another embodiment, visual aid data may comprise data representative of an extended runway centerline indicator derived by an IG processor using runway data. Such extended runway centerline may correspond to a visual extended runway centerline and could comprise of, for example, a plurality of "upside-down T's" depicted as extending away from the beginning of a runway and in the same direction as the runway centerline.

In another embodiment, visual aid data may comprise data representative of one or more alert indicators derived by an IG processor using runway data. Each alert indicator could correspond to one or more alert points on a runway, where each alert point may correspond to an alert distance measured between a threshold of the runway and an alert point. An alert point could be defined or configured by an end-user or manufacturer and could be used as the basis for providing the pilot or air crew an alert associated with the runway environment. For example, an alert point could be set at the end of a runway; that is, an alert distance could equal the length of the runway. In another example, an alert point could be treated by an end-user or manufacturer as a safety factor and set as a fixed distance from the end of the runway or a variable distance such as a percentage of the length of a runway. Those skilled in the art will appreciate the ability and ease with which executable software code may be reprogrammed or modified by a manufacturer or end-user to facilitate a configuration of an alert point on a runway.

In an additional embodiment, visual aid data may comprise data representative of one or more runway indicators derived by an IG processor using input factor data. Each indicator could correspond to a point or zone(s) on a runway which may be determined by applying one or more inputs factors to a configurable landing profile. As a result of such application, a landing distance comprising an air distance plus a rollout distance could be determined by an IG processor.

The flowchart continues to module 408 with the generation of an image data set by an IG processor comprising of terrain data, runway data, and visual aid data. As embodied herein, an IG processor could determine terrain image data from terrain data if terrain image data has not been previously provided; such terrain data could be based upon navigation data and be representative of the scene outside of the aircraft at the position of the aircraft. As discussed above, runway data could correspond to at least one runway located within the scene outside of an aircraft based on the position of the aircraft, and visual aid data may be data representative of an indication displayed on a display unit such as an HDD unit or a HUD unit where such indication could correspond to one or more points or zone(s) located on a runway.

In an additional embodiment, an IG processor may generate visual alert data if a landing distance determined in real time by applying one or more input factors to a landing profile is equal to or greater than an alert distance corresponding to a rollout alert point. Additionally, an IG processor may generate visual alert data if an air distance determined in real time by applying one or more input factors to a landing profile is equal to or less than an alert distance corresponding to a threshold alert point. Visual alert data may be associated with the level of threat that could be associated with an alert point, i.e., one requiring immediate crew awareness or immediate crew attention. If generated by an IG processor, visual alert data could be included in the determination of the image data set, whereby the image presented on a display unit could include a visual alert.

In an additional embodiment, an IG processor may generate alert data under the same conditions discussed in the preceding paragraph for visual alert data, where the alert data may be associated with the level of threat that could be associated with an alert point. If generated by an IG processor, the alert data could be provided to a crew alerting system comprising of a display unit, an aural alert unit, a tactile alert unit, or any combination thereof for the display of a visual alert, the sounding of an aural alert, or the producing of a tactile alert, respectively.

The flowchart continues to module 410 with the providing of an image data set to a display unit comprising an HDD unit, a HUD unit, or both. Such image data set may be representative of a three-dimensional perspective view of a scene outside the aircraft. As embodied herein, an image presented on a display unit may be represented in the image data set, whereby the image could contain one or more runways depicted with one or more visual aids including, but not limited to, runway markings, an extended runway centerline, one or more points on a runway associated with a landing, or any combination thereof. In an additional embodiment, a display unit such as an HDD unit and/or a HUD unit may display a visual alert if an IG processor generates visual alert data and includes such data in the determination of the image data set. In an additional embodiment, a display unit could display a visual alert, an aural alert unit could sound an aural alert, a tactile alert unit could produce a tactile alert, or any combination thereof if an IG processor generates alert data and provides the alert data to a crew alerting system. Then, the flowchart proceeds to the end.

It should be noted that the method steps described above could be embodied in computer-readable media including, but not limited to, computer instruction code. It shall be appreciated to those skilled in the art that not all method steps must be performed, nor must they be performed in the order stated. As embodied herein, the actions that could be performed by an IG processor 180 are included as method steps.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements thereto as falling within the true spirit and scope of the present invention.

What is claimed is:

1. A system for generating visual aids presentable on an aircraft display unit, such system comprising:
    a source of navigation data;
    a source of terrain data;
    a source of runway data;
    at least one source of input factor data;
    an image generating processor configured to
        receive navigation data representative of position and orientation of an aircraft,
        receive terrain data and runway data based upon the navigation data,
        receive input factor data representative of at least one input factor,
        determine visual aid data based upon the runway data and the input factor data and representative of a plurality of visual aids including a touchdown zone indicator and at least one of a stop distance point indicator and a touchdown point indicator, where
            the touchdown zone indicator is located off of and adjacent to a runway and includes a plurality of boundaries, where
                a location of a first boundary is dependent upon a configurable threshold alert point located on the runway and beyond the beginning of the runway that is available for landing, and
                a location of a second boundary is derived from an application of at least one input factor to a landing profile of the aircraft which determines a minimum rollout distance to a rollout alert point for the runway,
            the stop distance point indicator indicates a rollout point on the runway where the aircraft is predicted to complete its rollout and stop, where
                a location of the stop distance point indicator is derived from an application of at least one input factor to a landing profile of the aircraft, and the touchdown point indicator indicates an estimated touchdown point where the aircraft is predicted to touchdown, where
a location of the touchdown point indicator is derived from an application of at least one input factor to a landing profile of the aircraft,
generate an image data set representative of the plurality of visual aids and a three-dimensional scene outside the aircraft, wherein
the image data set is determined as a function of
the terrain data,
the runway data, and
the visual aid data, and
provide the image data set to an aircraft display unit; and
the aircraft display unit configured to
receive the image data set, and
present an image represented in the image data set, whereby
the runway is depicted with the plurality of two visual aids represented in the visual aid data.

2. The system of claim 1, wherein
the plurality of visual aids includes runway markings derived from the application of the runway data, where
the runway markings conform to markings standards adopted by an aviation-governing authority.

3. The system of claim 1, wherein
the plurality of visual aids includes an extended runway centerline indicator derived from the application of the runway data and the navigation data, where
the extended runway centerline indicator indicates an extended runway centerline.

4. The system of claim 1, wherein the plurality of visual aids includes at least one alert indicator.

5. The system of claim 1, wherein
the image generating processor is further configured to
generate visual alert data representative of at least one visual alert, wherein the visual alert data is generated if
a landing distance derived from the application of at least one input factor to a landing profile of the aircraft is equal to or greater than an alert distance corresponding to the rollout alert point for the runway, and
include the visual alert data in the generation of the image data set.

6. The system of claim 1, wherein
the image generating processor is further configured to
generate visual alert data representative of at least one visual alert, wherein the visual alert data is generated if
an air distance derived from the application of at least one input factor to a landing profile of the aircraft is equal to or less than an alert distance corresponding to the configurable threshold alert point, and
include the visual alert data in the generation of the image data set.

7. The system of claim 1, further comprising:
a crew alerting system is configured to
receive alert data representative of at least one alert from the image generating processor further configured to
generate the alert data representative of at least one alert, wherein the alert data is generated if
a landing distance derived from the application of at least one input factor to a landing profile of the aircraft is equal to or greater than an alert distance corresponding to the rollout alert point for the runway, or
an air distance derived from the application of at least one input factor to a landing profile of the aircraft is equal to or less than an alert distance corresponding to the configurable threshold alert point, and
provide the alert data to the crew alerting system.

8. An apparatus for generating visual aids presentable on an aircraft display unit, such apparatus comprising:
an input communications interface to facilitate a receiving of data from at least one data source by an image generating processor;
the image generating processor configured to
receive navigation data representative of position and orientation of an aircraft,
receive terrain data and runway data based upon the navigation data,
receive input factor data representative of at least one input factor,
determine visual aid data based upon the runway data and the input factor data and representative of a plurality of visual aids including a touchdown zone indicator and at least one of a stop distance point indicator and a touchdown point indicator, where
the touchdown zone indicator is located off of and adjacent to a runway and includes a plurality of boundaries, where
a location of a first boundary is dependent upon a configurable threshold alert point located on the runway and beyond the beginning of the runway that is available for landing, and
a location of a second boundary is derived from an application of at least one input factor to a landing profile of the aircraft which determines a minimum rollout distance to a rollout alert point for the runway,
the stop distance point indicator indicates a rollout point on the runway where the aircraft is predicted to complete its rollout and stop, where
a location of the stop distance point indicator is derived from an application of at least one input factor to a landing profile of the aircraft, and
the touchdown point indicator indicates an estimated touchdown point where the aircraft is predicted to touchdown, where
a location of the touchdown point indicator is derived from an application of at least one input factor to a landing profile of the aircraft,
generate an image data set representative of the plurality of visual aids and a three-dimensional scene outside the aircraft, wherein
the image data set is determined as a function of
the terrain data,
the runway data, and
the visual aid data, and
provide the image data set to an output communications interface; and
the output communications interface configured to facilitate a providing of the image data set to an aircraft display unit.

9. The apparatus of claim 8, wherein
the plurality of visual aids includes runway markings derived from the application of the runway data, where
the runway markings conform to markings standards adopted by an aviation-governing authority.

10. The apparatus of claim 8, wherein
the plurality of visual aids includes an extended runway centerline indicator derived from the application of the runway data and the navigation data, where
the extended runway centerline indicator indicates an extended runway centerline.

11. The apparatus of claim 8, wherein the plurality of visual aids includes at least one alert indicator.

12. The apparatus of claim 8, wherein
the image generating processor is further configured to
generate visual alert data representative of at least one visual alert, wherein the visual alert data is generated if
a landing distance derived from the application of at least one input factor to a landing profile of the aircraft is equal to or greater than an alert distance corresponding to the rollout alert point for the runway, and
include the visual alert data in the generation of the image data set.

13. The apparatus of claim 8, wherein
the image generating processor is further configured to
generate visual alert data representative of at least one visual alert, wherein the visual alert data is generated if
an air distance derived from the application of at least one input factor to a landing profile of the aircraft is equal to or less than an alert distance corresponding to the configurable threshold alert point, and
include the visual alert data in the generation of the image data set.

14. The apparatus of claim 8, wherein
the image generating processor further configured to
generate alert data representative of at least one alert, wherein the alert data is generated if
a landing distance derived from the application of at least one input factor to a landing profile of the aircraft is equal to or greater than an alert distance corresponding to the rollout alert point for the runway, or
an air distance derived from the application of at least one input factor to a landing profile of the aircraft is equal to or less than an alert distance corresponding to the configurable threshold alert point, and
provide the alert data to the output communications interface; and
the output communications interface is further configured to facilitate the providing of the alert data to a crew alerting system.

15. A method for generating visual aids presentable on an aircraft display unit, such method is performed by an aircraft avionics system processor, such method comprising:
receiving navigation data representative of position and orientation of an aircraft from an aircraft navigation data source;
receiving terrain data and runway data from an aircraft terrain data source and an aircraft runway data source, respectively, based upon the navigation data;
receiving input factor data representative of at least one input factor from at least one input factor source;
determining visual aid data based upon the runway data and the input factor data and representative of a plurality of visual aids including a touchdown zone indicator and at least one of a stop distance point indicator and a touchdown point indicator, where
the touchdown zone indicator is located off of and adjacent to a runway and includes a plurality of boundaries, where
a location of a first boundary is dependent upon a configurable threshold alert point located on the runway and beyond the beginning of the runway that is available for landing, and
a location of a second boundary is derived from an application of at least one input factor to a landing profile of the aircraft which determines a minimum rollout distance to a rollout alert point for the runway,
the stop distance point indicator indicates a rollout point on the runway where the aircraft is predicted to complete its rollout and stop, where
a location of the stop distance point indicator is derived from an application of at least one input factor to a landing profile of the aircraft, and
the touchdown point indicator indicates an estimated touchdown point where the aircraft is predicted to touchdown, where
a location of the touchdown point indicator is derived from an application of at least one input factor to a landing profile of the aircraft;
generating an image data set representative of the plurality of visual aids and a three-dimensional scene outside the aircraft, wherein
the image data set is determined as a function of
the terrain data,
the runway data, and
the visual aid data; and
providing the image data set to an aircraft display unit.

16. The method of claim 15, wherein
the plurality of visual aids includes runway markings derived from the application of the runway data, where the runway markings correspond to markings standards adopted by an aviation-governing authority.

17. The method of claim 15, wherein
the plurality of visual aids includes runway markings derived from the application of the runway data, where the extended runway centerline indicator indicates an extended runway centerline.

18. The method of claim 15, wherein the plurality of visual aids includes at least one alert indicator.

19. The method of claim 15, further comprising:
generating visual alert data representative of at least one visual alert, wherein the visual alert data is generated if
a landing distance derived from the application of at least one input factor to a landing profile of the aircraft is equal to or greater than an alert distance corresponding to the rollout alert point for the runway; and
including the visual alert data in the generation of the image data set.

20. The method of claim 15, further comprising:
generating visual alert data representative of at least one visual alert, wherein the visual alert data is generated if
an air distance derived from the application of at least one input factor to a landing profile of the aircraft is equal to or less than an alert distance corresponding to the configurable threshold alert point; and
including the visual alert data in the generation of the image data set.

21. The method of claim 15, further comprising:
generating alert data representative of at least one alert, wherein the alert data is generated if
a landing distance derived from the application of at least one input factor to a landing profile of the aircraft is equal to or greater than an alert distance corresponding to the rollout alert point for the runway, or an air distance derived from the application of at least one input factor to a landing profile of the aircraft is equal to or less than an alert distance corresponding to the configurable threshold alert point; and providing the alert data to a crew alerting system.

* * * * *